United States Patent
Takahashi et al.

(10) Patent No.: US 11,848,755 B2
(45) Date of Patent: *Dec. 19, 2023

(54) ANOMALY DETECTION DEVICE, ANOMALY DETECTION METHOD, AND RECORDING MEDIUM

(71) Applicant: Panasonic Intellectual Property Corporation of America, Torrance, CA (US)

(72) Inventors: Ryota Takahashi, Osaka (JP); Takamitsu Sasaki, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/090,018

(22) Filed: Dec. 28, 2022

(65) Prior Publication Data

US 2023/0164159 A1 May 25, 2023

Related U.S. Application Data

(63) Continuation of application No. 16/809,068, filed on Mar. 4, 2020, now Pat. No. 11,575,538, which is a (Continued)

(30) Foreign Application Priority Data

May 23, 2018 (JP) ................................ 2018-098855

(51) Int. Cl.
*H04L 12/40* (2006.01)
*B60R 16/023* (2006.01)
*H04L 9/40* (2022.01)

(52) U.S. Cl.
CPC ............ *H04L 12/40* (2013.01); *B60R 16/023* (2013.01); *H04L 63/101* (2013.01);
(Continued)

(58) Field of Classification Search
CPC .......................... H04L 63/1425; H04L 63/101
See application file for complete search history.

(56) References Cited

U.S. PATENT DOCUMENTS 9,158,962 B1 * 10/2015 Nemat-Nasser ...... G06T 1/0007
9,616,828 B2 * 4/2017 Ben Noon .......... H04L 63/1425
(Continued)

FOREIGN PATENT DOCUMENTS

| EP | 3609139 | 3/2022 |
| EP | 3968575 | 3/2022 |

(Continued)

OTHER PUBLICATIONS

International Search Report (ISR) dated May 28, 2019 in International (PCT) Application No. PCT/JP2019/017014.
(Continued)

*Primary Examiner* — Jay P Patel
(74) *Attorney, Agent, or Firm* — Wenderoth, Lind & Ponack, L.L.P.

(57) ABSTRACT

An anomaly detection device is located between a network and a first ECU in the plurality of ECUs, and includes: a communication circuit; a processor; and a memory including a set of instructions that, when executed, causes the processor to perform operations including: receiving a message from the first ECU and transmitting the message to the network, and receiving a message from the network and transmitting the message to the first ECU, using the communication circuit; holding, in the memory, a received ID list; when an ID of the message received by the communication circuit from the network is not included in the
(Continued)

received ID list, adding the ID to the received ID list; and when an ID of the message received by the communication circuit from the first ECU is included in the received ID list, causing the communication circuit not to transmit the message to the network.

10 Claims, 22 Drawing Sheets

Related U.S. Application Data continuation of application No. PCT/JP2019/017014, filed on Apr. 22, 2019.

(52) U.S. Cl.
CPC ............... *H04L 63/1425* (2013.01); *H04L 2012/40215* (2013.01); *H04L 2012/40273* (2013.01)

(56) References Cited

U.S. PATENT DOCUMENTS

| | | | |
|---|---|---|---|
| 9,756,024 B2* | 9/2017 | Benedek | H04L 9/0825 |
| 10,083,071 B2* | 9/2018 | Sonalker | G06F 11/0739 |
| 10,142,358 B1* | 11/2018 | Bajpai | H04L 1/201 |
| 10,187,406 B2* | 1/2019 | Maeda | B60R 16/0231 |
| 10,298,612 B2* | 5/2019 | Galula | H04L 67/12 |
| 10,609,049 B2* | 3/2020 | Maeda | H04L 12/28 |
| 10,708,293 B2* | 7/2020 | Galula | H04L 63/1416 |
| 10,713,106 B2 | 7/2020 | Tanabe | |
| 10,791,129 B2 | 9/2020 | Maeda | |
| 10,798,114 B2* | 10/2020 | Galula | H04L 63/1425 |
| 10,798,117 B2* | 10/2020 | Haga | H04L 12/40006 |
| 10,846,166 B2* | 11/2020 | Sonalker | G06F 11/079 |
| 10,931,635 B2 | 2/2021 | Rhee | |
| 11,115,433 B2* | 9/2021 | Galula | H04L 63/1425 |
| 11,190,533 B2* | 11/2021 | Tsurumi | B60R 16/0232 |
| 11,252,180 B2* | 2/2022 | Galula | B60R 25/10 |
| 11,277,427 B2* | 3/2022 | Ben-Noon | G07C 5/0816 |
| 11,356,475 B2 | 6/2022 | Ujiie | |
| 11,496,491 B2* | 11/2022 | Maeda | H04L 63/1416 |
| 11,595,422 B2* | 2/2023 | Ujiie | H04L 63/1425 |
| 2015/0379331 A1* | 12/2015 | Nemat-Nasser | G06T 1/0007 382/118 |
| 2017/0026386 A1 | 1/2017 | Unagami | |
| 2018/0076955 A1* | 3/2018 | Shields | H04L 63/06 |
| 2018/0262466 A1 | 9/2018 | Atad | |
| 2018/0295147 A1 | 10/2018 | Haga | |
| 2018/0300477 A1 | 10/2018 | Galula | |
| 2018/0314571 A1 | 11/2018 | Tanabe | |
| 2019/0052653 A1* | 2/2019 | Galula | B60R 16/02 |
| 2019/0149562 A1 | 5/2019 | Maeda | |
| 2019/0173912 A1 | 6/2019 | Ujiie | |
| 2019/0294889 A1* | 9/2019 | Sriram | G06F 18/24143 |
| 2020/0145252 A1 | 5/2020 | Torisaki | |
| 2020/0342099 A1 | 10/2020 | Kerstein | |
| 2020/0389475 A1 | 12/2020 | Maeda | |
| 2020/0396238 A1 | 12/2020 | Haga | |
| 2021/0075807 A1 | 3/2021 | Park | |
| 2021/0306365 A1* | 9/2021 | Ujiie | H04L 12/40006 |
| 2022/0279005 A1* | 9/2022 | Torisaki | H04L 12/40006 |

FOREIGN PATENT DOCUMENTS

| | | |
|---|---|---|
| WO | 2017/104112 | 6/2017 |
| WO | 2017/119246 | 7/2017 |
| WO | 2018/186054 | 10/2018 |

OTHER PUBLICATIONS

Kiyotaka Atsumi, et al., "Smart CAN cable, Another proposal of intrusion prevention system (IPS) for in-vehicle networks", 2018 Symposium on Cryptography and Information Security, The Institute of Electronics, Information and Communication Engineers, Jan. 2018, pp. 1-4.

Tsutomu Matsumoto, et al., "A Method of Preventing Unauthorized Data Transmission in Controller Area Network", 2012 IEEE 75th Vehicular Technology Conference (VTC Spring), May 2012.

* cited by examiner

FIG. 4

| SOF | ID FIELD | RTR | IDE | r | DLC | DATA FIELD | CRC | ACK DEL | DEL | EOF |

RECESSIVE
DOMINANT

FIG. 5
| ECU NAME | ID OF MESSAGE TO BE TRANSMITTED |
|---|---|
| ENGINE ECU | 0x13, 0x15, 0x10 |
| BRAKE ECU | 0x160, 0x330, 0x378 |
| DOOR CONTROL ECU | 0x430 |
| ... | ... |
FIG. 6
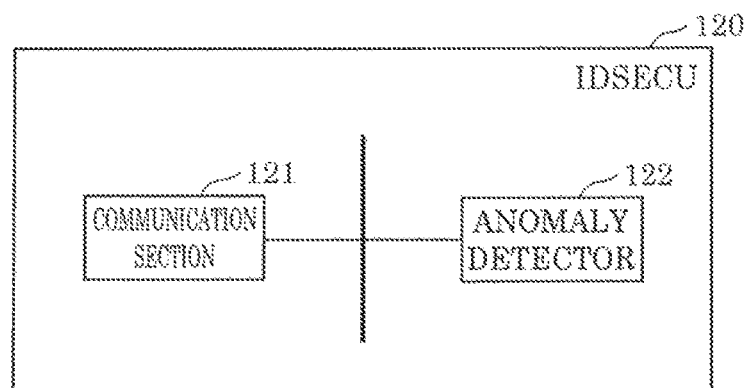
FIG. 7
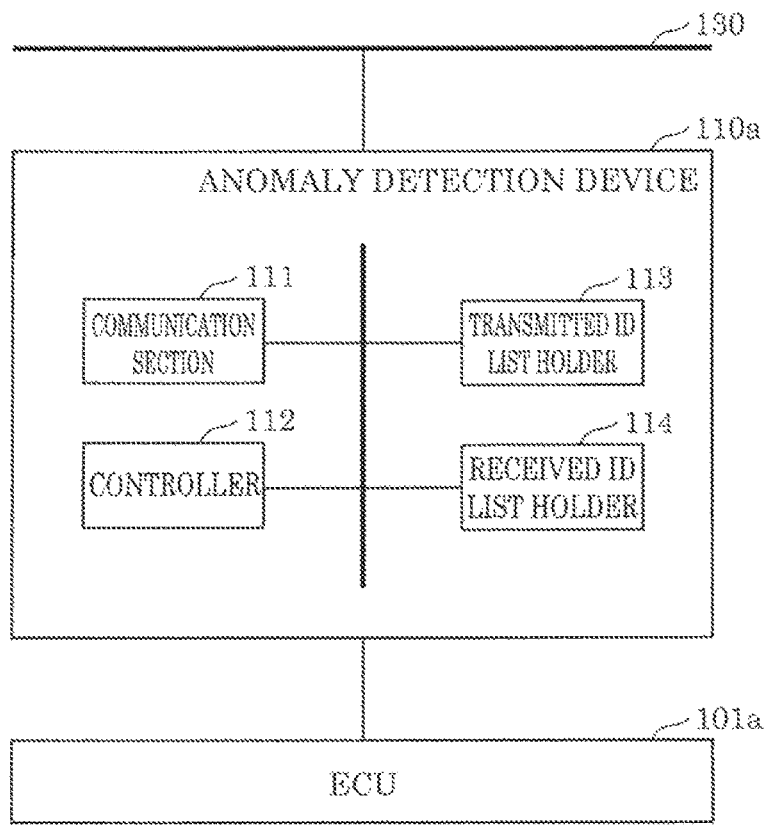

| ID OF RECEIVED MESSAGE | NUMBER OF RECEIVED MESSAGES | NUMBER OF RECEIVED MESSAGES FOR LAST 1 MINUTE |
|---|---|---|
| 0x25 | 56330 | 89 |
| 0x27 | 4424 | 16 |
| 0x89 | 566 | 2 |
| ... | ... | ... |

| ID OF TRANSMITTED MESSAGE | NUMBER OF TRANSMITTED MESSAGES | NUMBER OF TRANSMITTED MESSAGES FOR LAST 1 MINUTE |
|---|---|---|
| 0x253 | 6780 | 293 |
| 0x272 | 243 | 16 |
| 0x349 | 60 | 1 |
| ... | ... | ... |

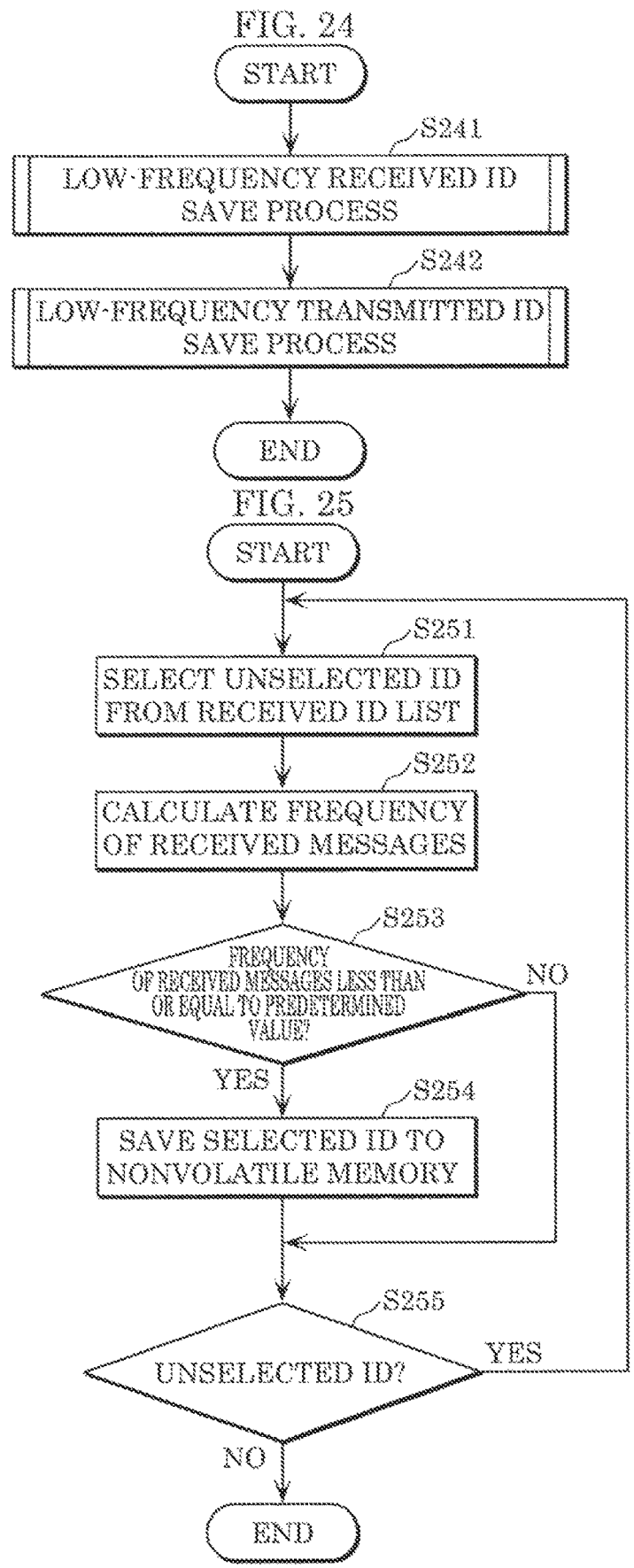

ANOMALY DETECTION DEVICE, ANOMALY DETECTION METHOD, AND RECORDING MEDIUM

CROSS REFERENCE TO RELATED APPLICATIONS

This application is a continuation of U.S. application Ser. No. 16/809,068, filed Mar. 4, 2020, which is a U.S. continuation application of PCT International Patent Application Number PCT/JP2019/017014 filed on Apr. 22, 2019, claiming the benefit of priority of Japanese Patent Application Number 2018-098855 filed on May 23, 2018, the entire contents of which are hereby incorporated by reference.

BACKGROUND

1. Technical Field

The present disclosure relates to an anomaly detection device, etc. used in an in-vehicle network or the like.

2. Description of the Related Art

For computerized automobiles, in-vehicle networks are more important than for automobiles which are less computerized. Such an automobile carries many electronic control units (hereafter referred to as "ECUs") for controlling various systems. The ECUs are connected to an in-vehicle network, and communicate with each other through the in-vehicle network to achieve various functions of the automobile. A Controller Area Network (CAN) is one of the in-vehicle network standards, and is defined in ISO 11898 and ISO 11519 and used in many countries and regions as standard technology.

A network conforming to the CAN protocol can be built as a closed communication path in one automobile. However, often the automobile is provided with and carries a network accessible from outside. For example, the in-vehicle network may have a port for extracting information flowing through the network in order to use the information for diagnosis of each system included in the automobile, or be connected to a car navigation system having a function of providing a wireless LAN. Enabling external access to the in-vehicle network can offer greater convenience to the automobile user, but also increase threats.

For example, it was proven in 2013 that unauthorized vehicle control by misusing parking support function or the like from outside an in-vehicle network was possible. Moreover, it was proven in 2015 that unauthorized remote control of a specific car model was possible, leading to a recall of the car model.

Such unauthorized vehicle control by external access is a problem that cannot be overlooked in the automobile industry, and security measures for in-vehicle networks are urgently needed.

One technique of attacking an in-vehicle network is to access an ECU connected to the in-vehicle network from outside and take over the ECU, and transmit a message for the attack (hereafter also referred to as "unauthorized message" or "anomalous message") from the taken-over ECU to the in-vehicle network to control the automobile unauthorizedly.

Against such an attack, Smart CAN cable, Another proposal of intrusion prevention system (IPS) for in-vehicle networks—LAC Co., Ltd., Symposium on Cryptography and Information Security, 2018 discloses the following method: A node called an intrusion detection system (IDS) ECU that detects unauthorized messages from among messages transmitted to an in-vehicle network is added to the in-vehicle network, and the IDS ECU transmits a hash value of an unauthorized message to the network. By comparing this hash value with a hash value of a message transmitted from each ECU, an unauthorized ECU transmitting an unauthorized message is identified, and blocked from the in-vehicle network.

A Method of Preventing Unauthorized Data Transmission in controller area network—Yokohama National University: Vehicular Technology Conference, 2012 discloses the following method: Based on the premise that a plurality of ECUs do not transmit messages with the same ID in an in-vehicle network, when any ECU receives a message with an ID to be transmitted by the ECU, the message is blocked as an unauthorized message.

SUMMARY

However, with the method in Smart CAN cable, Another proposal of intrusion prevention system (IPS) for in-vehicle networks—LAC Co., Ltd., Symposium on Cryptography and Information Security, 2018, adding the IDS ECU in the in-vehicle network entails cost, and transmitting the hash value of the unauthorized message to the network increases the traffic load of the network.

With the method in A Method of Preventing Unauthorized Data Transmission in controller area network—Yokohama National University: Vehicular Technology Conference, 2012, a CAN controller needs to be modified in order to block an unauthorized message (for example, needs to store an ID of a message to be transmitted from each ECU), which requires high introduction cost.

To solve the problem stated above, the present disclosure has an object of providing an anomaly detection device, etc. capable of easily detecting an anomaly in an in-vehicle network.

To solve the problem stated above, an anomaly detection device according to an aspect of the present disclosure is an anomaly detection device in an in-vehicle network that includes a plurality of electronic control units (ECUs), a network, and the anomaly detection device, the anomaly detection device being located between the network and a first ECU included in the plurality of ECUs, and including: a communication circuit; a processor; and at least one memory including at least one set of instructions that, when executed by the processor, causes the processor to perform operations including; receiving a message from the first ECU and transmitting the message to the network, and receiving a message from the network and transmitting the message to the first ECU, using the communication circuit; holding, in the at least one memory, a received ID list which is a list of IDs of messages that the communication circuit has received from the network and transmitted to the first ECU; in the case where an ID of the message received by the communication circuit from the network is not included in the received ID list, adding the ID to the received ID list; and in the case where an ID of the message received by the communication circuit from the first ECU is included in the received ID list, causing the communication circuit not to transmit the message to the network.

These general and specific aspects may be implemented using a system, a device, a method, an integrated circuit, a computer program, or a computer-readable recording medium such as a recording disk, or any combination of systems, devices, methods, integrated circuits, computer programs, and recording media. Examples of the computer-readable recording medium include nonvolatile recording media such as CD-ROM (Compact Disc-Read Only Memory).

According to the present disclosure, an anomaly in an in-vehicle network can be easily detected.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating a data frame format of a CAN protocol in Embodiment 1;

FIG. 5 is a diagram illustrating specifications of IDs transmitted by ECUs included in the in-vehicle network in Embodiment 1;

FIG. 6 is a block diagram of an IDS ECU in Embodiment 1;

FIG. 7 is a block diagram of an anomaly detection device in Embodiment 1;

FIG. 24 is a flowchart of a process of the anomaly detection device when a vehicle shuts down in Embodiment 1;

FIG. 25 is a flowchart of a low-frequency received ID save process in Embodiment 1;

DETAILED DESCRIPTION OF THE EMBODIMENT

Figure 1:
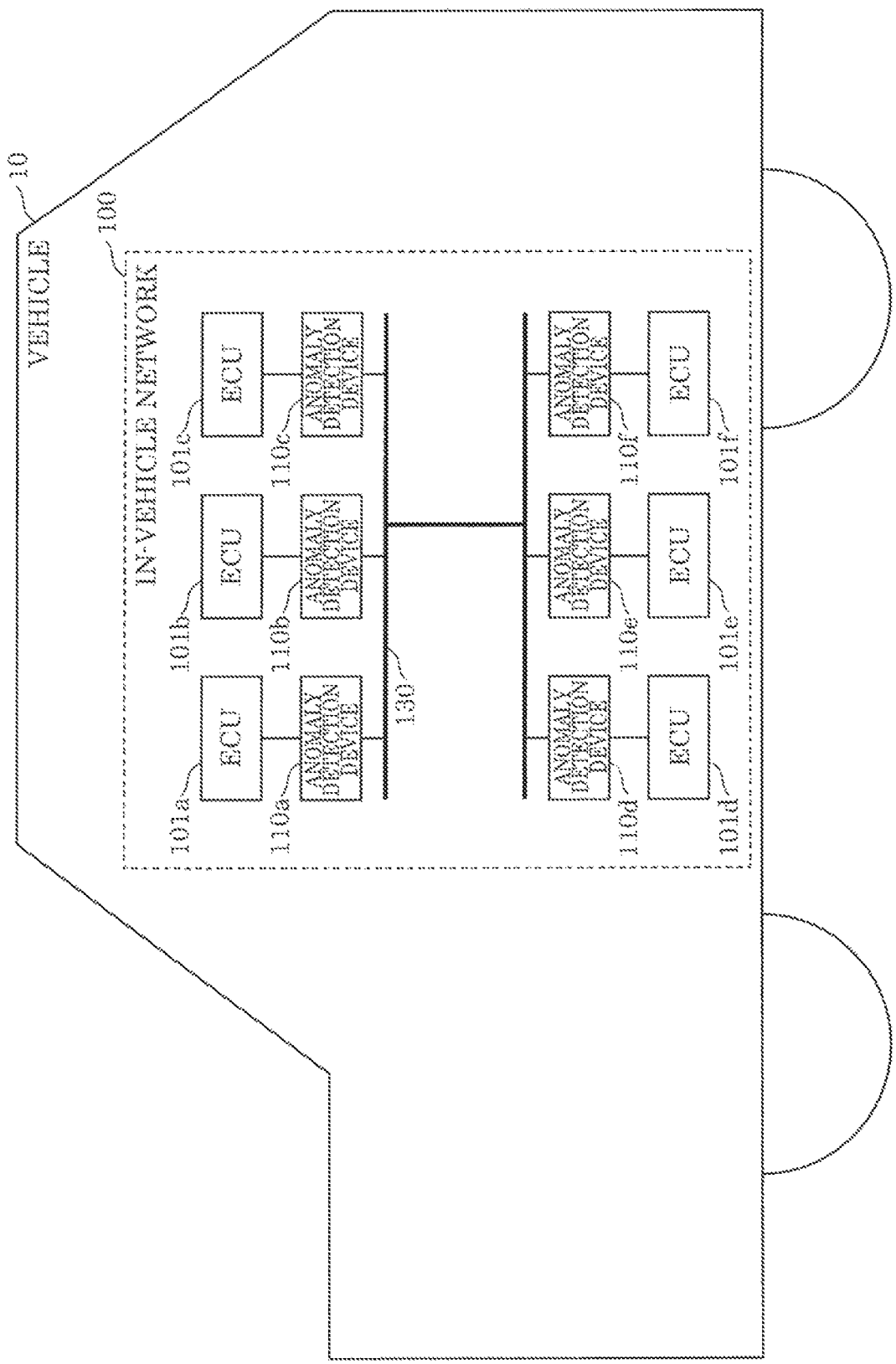
FIG. 1 is a block diagram of an overall structure of an in-vehicle network in Embodiment 1.

An anomaly detection device according to the present disclosure is an anomaly detection device in an in-vehicle network that includes a plurality of electronic control units (ECUs), a network, and the anomaly detection device, the anomaly detection device being located between the network and a first ECU included in the plurality of ECUs, and including: a communication section that receives a message from the first ECU and transmits the message to the network, and receives a message from the network and transmits the message to the first ECU; a received ID list holder that holds a received ID list which is a list of IDs of messages that the communication section has received from the network and transmitted to the first ECU; and a controller that controls the communication section and the received ID list holder, wherein the controller: in the case where an ID of the message received by the communication section from the network is not included in the received ID list, adds the ID to the received ID list; and in the case where an ID of the message received by the communication section from the first ECU is included in the received ID list, causes the communication section not to transmit the message to the network.

The anomaly detection device adds IDs of messages received from the network, to the received ID list. In detail, the anomaly detection device adds IDs of messages transmitted to the network from ECUs other than the first ECU connected to the network via the anomaly detection device from among the plurality of ECUs, to the received ID list. Specifications usually applied define that a plurality of ECUs in an in-vehicle network do not transmit messages including the same ID. Under such specifications, the received ID list is a list of IDs of messages not transmitted by the first ECU. In the case where an ID of a message received by the anomaly detection device from the first ECU (i.e. a message transmitted by the first ECU) is included in the received ID list, this means a message that is supposed to be not transmitted by the first ECU is transmitted by the first ECU. In other words, the first ECU transmits an anomalous message. In such a case, by not transmitting the message received from the first ECU to the network, the anomalous message can be kept from flowing in the network. Thus, an anomaly in the in-vehicle network can be easily detected, without adding an IDS ECU in the in-vehicle network (i.e. without increasing the network traffic and cost) or prestoring an ID of a message transmitted from each ECU. Moreover, unless an attacker transmits an unauthorized message to the network before an authorized message flows in the network, the anomalous message can be blocked without erroneous detection.

For example, in the case where the ID of the message received by the communication section from the first ECU is included in the received ID list, the controller may isolate the first ECU from the network.

In this case, the first ECU that is an unauthorized ECU can be isolated from the network (for example, all messages transmitted from the first ECU are blocked at the anomaly detection device so as not to be transmitted to the network). Hence, the in-vehicle network can be less affected by the unauthorized ECU than in the case where only the anomalous message is blocked.

For example, in the case where the communication section receives, from the network, anomalous ID information transmitted from a second ECU included in the plurality of ECUs and different from the first ECU and indicating an ID that is anomalous, the controller may erase the ID indicated by the anomalous ID information from the received ID list.

There is a possibility that an attacker transmits an unauthorized message to the network before an authorized message flows in the network. In this case, an ID included in the unauthorized message is added to the received ID list. For example, in the case where an ID included in a message transmitted from the authorized first ECU is included in the unauthorized message, the authorized message transmitted from the authorized first ECU will end up being determined as an unauthorized message. This causes a situation in which subsequently the attacker impersonates the first ECU and transmits an unauthorized message to the network, while an authorized message is kept from being transmitted to the network. However, such an unauthorized message transmitted from the attacker can be detected by providing an IDS ECU or the like in the in-vehicle network as the second ECU. Hence, even in the case where an attacker transmits an unauthorized message to the network before an authorized message flows in the network (i.e. in the case where the received ID list is contaminated), by erasing an ID included in an unauthorized message and added to the received ID list (i.e. an ID included in a message transmitted from the first ECU) from the received ID list to correct the received ID list, the anomaly detection device can be prevented from erroneously detecting an authorized message as an unauthorized message.

For example, the received ID list holder may have a region for recording the number of received messages for each of the IDs included in the received ID list, and the controller may: when the communication section receives the message from the network, update the number of received messages recorded for the ID of the message; when a vehicle including the in-vehicle network shuts down, save an ID for which the number of received messages recorded in the received ID list holder or the frequency of received messages based on the number of received messages is less than or equal to a predetermined value from among the IDs included in the received ID list, to nonvolatile memory; and when the vehicle starts, add the ID saved to the nonvolatile memory, to the received ID list.

For an ID for which the number of received messages or the frequency of received messages is less than or equal to a predetermined value (i.e. an ID included in a message received at low frequency), it may take time until a message including the ID flows in the network after the vehicle starts. In detail, there is a possibility that, before an authorized message including the ID flows in the network, an attacker transmits an unauthorized message including the ID to the network and as a result the ID included in the unauthorized message is added to the received ID list (i.e. the received ID list is contaminated with the unauthorized ID). However, by adding an ID included in a message received at low frequency, which has been saved to the nonvolatile memory, to the received ID list when the vehicle starts, contamination of the received ID list caused by an attacker transmitting an unauthorized message before a message received at low frequency first flows in the network can be prevented. In addition, by not saving an ID included in a message received at high frequency to the nonvolatile memory, the memory capacity can be saved.

For example, when the vehicle starts, in the case where firmware information of the first ECU has been changed since the vehicle last started, the controller may erase the ID saved to the nonvolatile memory, without adding the ID to the received ID list.

In the case where the firmware information of the first ECU is changed as a result of a firmware update of the first ECU, there is a possibility that the specifications of an ID included in a message transmitted from the first ECU are changed. In such a case, by erasing the ID saved to the nonvolatile memory without adding the ID to the received ID list, erroneous blocking of a normal message due to the ID whose specifications have been changed can be prevented.

For example, the anomaly detection device may further include: a transmitted ID list holder that holds a transmitted ID list which is a list of IDs of messages that the communication section has received from the first ECU and transmitted to the network, wherein the controller: controls the transmitted ID list holder; in the case where the ID of the message received by the communication section from the first ECU is not included in the transmitted ID list, adds the ID to the transmitted ID list; and in the case where the ID of the message received by the communication section from the network is included in the transmitted ID list, causes the communication section not to transmit the message to the first ECU.

The anomaly detection device adds IDs of messages received from the first ECU, to the transmitted ID list. Under specifications that a plurality of ECUs in the in-vehicle network do not transmit messages including the same ID, the transmitted ID list is a list of IDs of messages not transmitted by any ECU or the like other than the first ECU from among the plurality of ECUs. In the case where an ID of a message received by the anomaly detection device from the network (i.e. a message transmitted from an ECU other than the first ECU) is included in the transmitted ID list, this means a message that is supposed to be not transmitted by an ECU or the like other than the first ECU is transmitted by an ECU or the like other than the first ECU. In other words, an ECU or the like other than the first ECU transmits an anomalous message. In such a case, by not transmitting the message received from an ECU or the like other than the first ECU to the first ECU, the anomalous message can be kept from being transmitted to the first ECU. Thus, an anomaly in the in-vehicle network can be easily detected, without adding an IDS ECU in the in-vehicle network (i.e. without increasing the network traffic and cost) or prestoring an ID of a message transmitted from each ECU. Moreover, unless an attacker transmits an unauthorized message to the network before an authorized message flows in the network, the anomalous message can be detected without error.

For example, the transmitted ID list holder may have a region for recording the number of transmitted messages for each of the IDs included in the transmitted ID list, and the controller may: when the communication section receives the message from the first ECU, update the number of transmitted messages recorded for the ID of the message; when a vehicle including the in-vehicle network shuts down, save an ID for which the number of transmitted messages recorded in the transmitted ID list holder or the frequency of transmitted messages based on the number of transmitted messages is less than or equal to a predetermined value from among the IDs included in the transmitted ID list, to nonvolatile memory; and when the vehicle starts, add the ID saved to the nonvolatile memory, to the transmitted ID list.

For an ID for which the number of transmitted messages or the frequency of transmitted messages is less than or equal to a predetermined value (i.e. an ID included in a message transmitted from the first ECU at low frequency), it may take time until the anomaly detection device receives a message including the ID from the first ECU after the vehicle starts. In detail, there is a possibility that, before the anomaly detection device receives an authorized message including the ID, an attacker attacks the first ECU and transmits an unauthorized message to the anomaly detection device from the unauthorized first ECU and as a result the ID included in the unauthorized message is added to the transmitted ID list (i.e. the transmitted ID list is contaminated with the unauthorized ID). However, by adding an ID included in a message transmitted at low frequency, which has been saved to the nonvolatile memory, to the transmitted ID list when the vehicle starts, contamination of the transmitted ID list caused by an attacker transmitting an unauthorized message before the anomaly detection device receives a message transmitted at low frequency can be prevented. In addition, by not saving an ID included in a message transmitted at high frequency to the nonvolatile memory, the memory capacity can be saved.

For example, when the vehicle starts, in the case where firmware information of the first ECU has been changed since the vehicle last started, the controller may erase the ID saved to the nonvolatile memory, without adding the ID to the transmitted ID list.

In the case where the firmware information of the first ECU is changed as a result of a firmware update of the first ECU, there is a possibility that the specifications of an ID included in a message transmitted from the first ECU are changed. In such a case, by erasing the ID saved to the nonvolatile memory without adding the ID to the transmitted ID list, erroneous blocking of a normal message due to the ID whose specifications have been changed can be prevented.

An anomaly detection method according to the present disclosure is an anomaly detection method for use in an anomaly detection device in an in-vehicle network that includes a plurality of electronic control units (ECUs), a network, and the anomaly detection device, the anomaly detection device being located between the network and a first ECU included in the plurality of ECUs, and including: a communication section that receives a message from the first ECU and transmits the message to the network, and receives a message from the network and transmits the message to the first ECU; and a received ID list holder that holds a received ID list which is a list of IDs of messages that the communication section has received from the network and transmitted to the first ECU, the anomaly detection method including: in the case where an ID of the message received by the communication section from the network is not included in the received ID list, adding the ID to the received ID list; and in the case where an ID of the message received by the communication section from the first ECU is included in the received ID list, causing the communication section not to transmit the message to the network.

Thus, an anomaly detection method capable of easily detecting an anomaly in an in-vehicle network can be provided.

A recording medium according to the present disclosure is a non-transitory computer-readable recording medium that stores a program for causing a computer to execute the foregoing anomaly detection method.

Thus, a recording medium storing a program capable of easily detecting an anomaly in an in-vehicle network can be provided.

An anomaly detection device according to an embodiment will be described below, with reference to the drawings. The embodiment described below shows a specific example of the present disclosure. The numerical values, structural elements, the arrangement and connection of the structural elements, steps, the order of steps, etc. shown in the following embodiment are mere examples, and do not limit the scope of the present disclosure.

Of the structural elements in the embodiment described below, the structural elements not recited in any one of the independent claims are structural elements that may be added optionally. Each drawing is a schematic, and does not necessarily provide precise depiction.

The following description about CANs and anomaly detection devices is mainly intended to help understanding of the present disclosure, and the scope of the present disclosure is not limited by matters in the description that are not included in the claims.

Embodiment 1

[1-1. In-Vehicle Network Structure]

FIG. 1 is a block diagram of an overall structure of in-vehicle network 100. In FIG. 1, vehicle 10 carries in-vehicle network 100. Vehicle 10 has in-vehicle network 100 therein. Vehicle 10 is, for example, an automobile.

In-vehicle network 100 includes a plurality of ECUs, a network, and one or more anomaly detection devices. In the example in FIG. 1, in-vehicle network 100 includes a plurality of anomaly detection devices corresponding one-to-one to the plurality of ECUs. For example, in-vehicle network 100 includes ECUs 101a, 101b, 101c, 101d, 101e, and 101f as the plurality of ECUs, bus 130 (network), and anomaly detection devices 110a, 110b, 110c, 110d, 110e, and 110f. ECU 101a and bus 130 are connected via anomaly detection device 110a, and communicate with each other. ECU 101b and bus 130 are connected via anomaly detection device 110b, and communicate with each other. ECU 101c and bus 130 are connected via anomaly detection device 110c, and communicate with each other. ECU 101d and bus 130 are connected via anomaly detection device 110d, and communicate with each other. ECU 101e and bus 130 are connected via anomaly detection device 110e, and communicate with each other. ECU 101f and bus 130 are connected via anomaly detection device 110f, and communicate with each other. For example, anomaly detection device 110a is located between bus 130 and a first ECU (ECU 101a in this example) included in the plurality of ECUs. When ECU 101a transmits a message to bus 130 and when ECU 101a receives a message from bus 130, the messages are transmitted and received via anomaly detection device 110a.

In in-vehicle network 100, communication is performed according to, for example, the controller area network (CAN) protocol.

ECUs 101a, 101b, 101c, 101d, 101e, and 101f included in in-vehicle network 100 are, for example, ECUs related to steering, brake, engine, door, window, etc. These ECUs perform various control for vehicle 10 such as driving control and control of an instrument panel.

Each ECU is, for example, a device including digital circuits such as a processor and memory, analog circuits, and communication circuits. The memory is, for example, read only memory (ROM) or random access memory (RAM), and can store a program executed by the processor. For example, various functions of each ECU are implemented by the processor operating according to the program. Each ECU transmits/receives messages via the network bus in the in-vehicle network according to the CAN protocol as an example.

Each ECU transmits/receives messages according to the CAN protocol to/from the network bus. For example, each ECU receives, from the network bus, a message transmitted by another ECU, and generates a message including information to be transmitted to another ECU and transmits the generated message to the bus. Specifically, each ECU performs a process corresponding to information included in a received message, and generates a message indicating the state of equipment, a sensor, or the like connected to the ECU or a message such as an instruction value (control value) for another ECU and transmits the generated message.

The anomaly detection device will be described in detail later.

[1-2. In-Vehicle Network Structure (Variation 1)]

Figure 2:
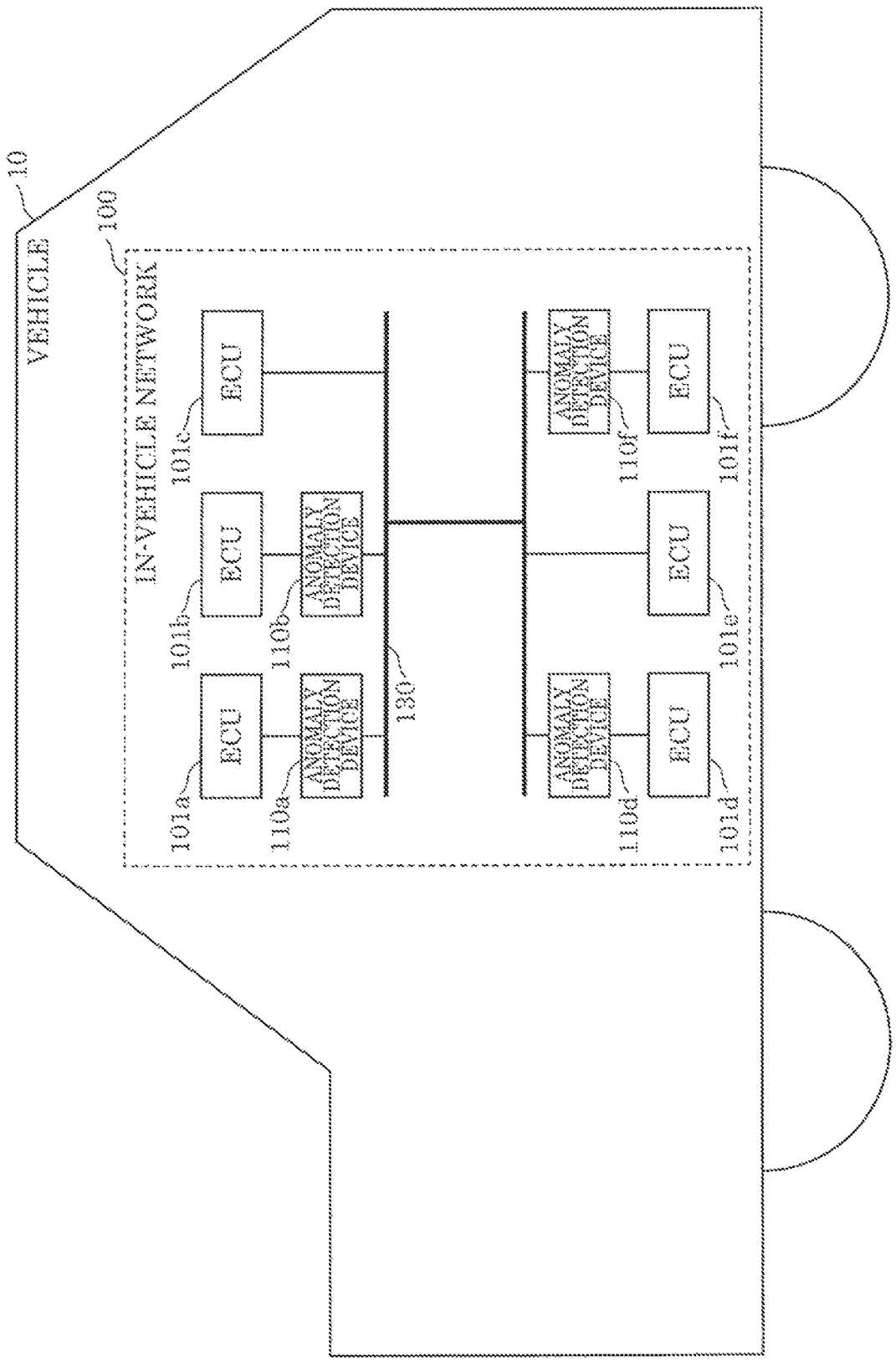
FIG. 2 is a diagram illustrating Variation 1 of the overall structure of the in-vehicle network in Embodiment 1.

FIG. 2 is a diagram illustrating Variation 1 of the overall structure of in-vehicle network 100. In in-vehicle network 100 in FIG. 1, each of the ECUs is connected with an anomaly detection device. In in-vehicle network 100 in FIG. 2, on the other hand, part of the ECUs is not connected with an anomaly detection device. Thus, the plurality of ECUs in in-vehicle network 100 may include one or more ECUs connected to bus 130 without an anomaly detection device therebetween.

Specifically, in FIG. 2, ECUs 101c and 101e are each not connected to an anomaly detection device but directly connected to bus 130. As illustrated in FIG. 2, the anomaly detection device need not necessarily be connected to every ECU. For example, the anomaly detection device may be provided only between a driving control-related ECU which is highly likely to have significant influence on vehicle safety and bus 130, to reduce cost.

[1-3. In-Vehicle Network Structure (Variation 2)]

Figure 3:
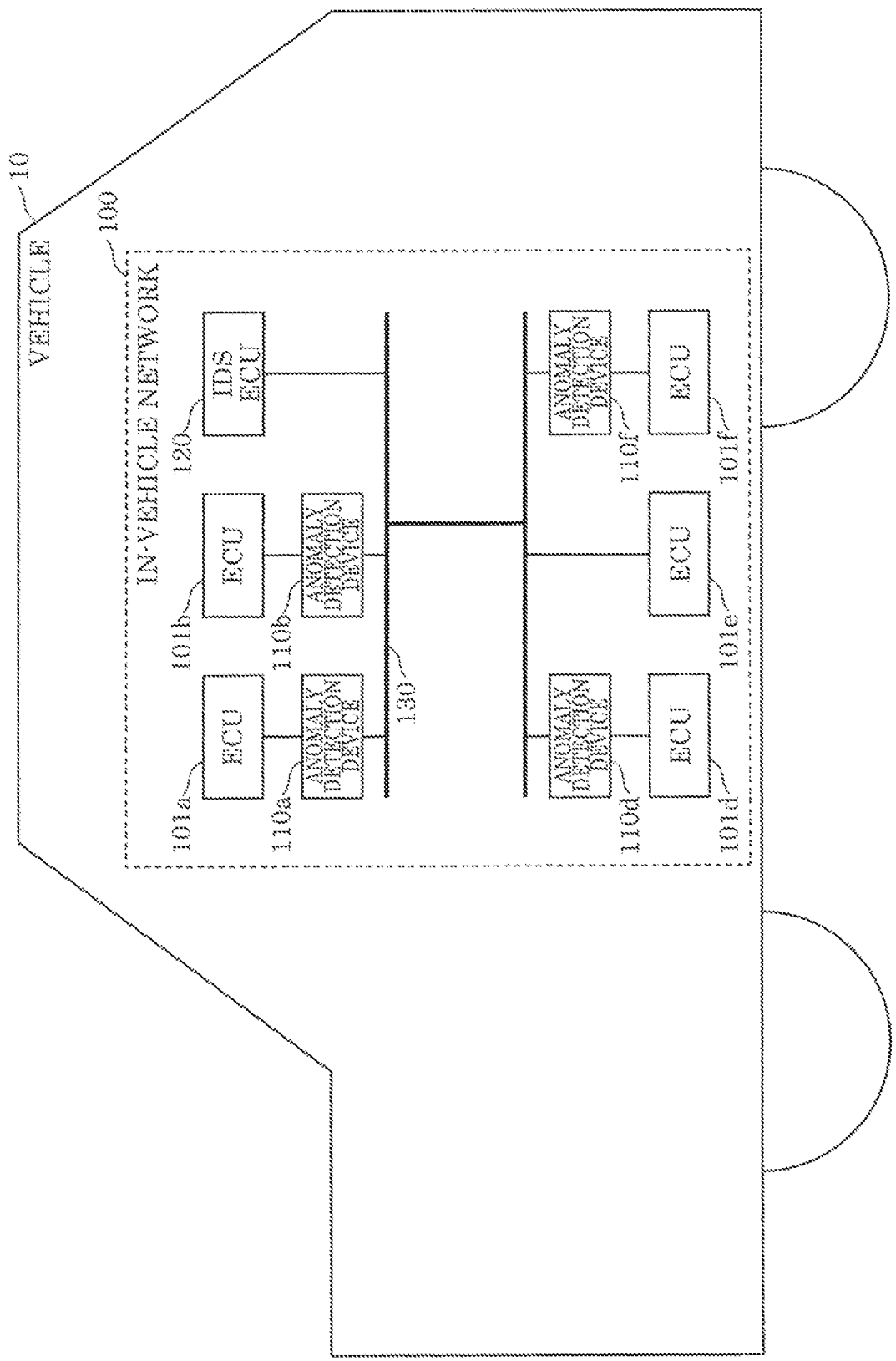
FIG. 3 is a diagram illustrating Variation 2 of the overall structure of the in-vehicle network in Embodiment 1.

FIG. 3 is a diagram illustrating Variation 2 of the overall structure of in-vehicle network 100. In-vehicle network 100 in FIG. 3 includes a node having an anomaly detection function, as compared with in-vehicle networks 100 in FIGS. 1 and 2. The node having an anomaly detection function is hereafter also referred to as an IDS ECU. In FIG. 3, IDS ECU 120 performs anomaly detection on a message flowing in bus 130, and, upon detecting an anomaly, notifies anomaly detection devices 110a, 110b, 110d, and 110f in the in-vehicle network of the information. IDS ECU 120 is hereafter also called a second ECU, to distinguish it from an ECU (first ECU) connected to bus 130 via an anomaly detection device.

[1-4. Format of CAN Message]

FIG. 4 is a diagram illustrating a format of a data frame in the CAN protocol. A data frame in a standard ID format in the CAN protocol is illustrated in the drawing. The data frame is composed of start of frame (SOF), ID field, remote transmission request (RTR), identifier extension (IDE), reserved bit (r), data length code (DLC), data field, CRC sequence, CRC delimiter (DEL), acknowledgement slot (ACK), ACK delimiter (DEL), and end of frame (EOF). The ID field stores an ID unique to a message transmitted by each ECU.

[1-5. Specifications of Transmission IDs of ECUs]

FIG. 5 is a diagram illustrating specifications of IDs transmitted by the ECUs included in in-vehicle network 100.

In in-vehicle network 100 in this embodiment, a plurality of ECUs do not transmit messages with the same ID, as illustrated in FIG. 5. For example, a message including an ID "0x13" transmitted by an engine ECU is not transmitted by a brake ECU or a door control ECU. The specifications that a plurality of ECUs do not transmit messages with the same ID are typical in communication using a CAN. By use of such specifications, the anomaly detection device can easily detect an anomaly in in-vehicle network 100.

[1-6. Structure of IDS ECU]

FIG. 6 is a block diagram of IDS ECU 120. IDS ECU 120 is an ECU including communication section 121 that transmits/receives CAN messages and anomaly detector 122 that performs anomaly detection on each received message, and is the second ECU different from the first ECU (e.g. ECUs 101a, 101b, 101d, and 1010 included the plurality of ECUs.

Communication section 121 receives a message flowing in bus 130, and transmits anomalous ID information indicating an anomalous ID included in the message flowing in bus 130 to bus 130.

Anomaly detector 122 performs anomaly detection on the message flowing in bus 130 and received by communication section 121. For example, IDS ECU 120 holds a determination rule for determining an anomaly, and anomaly detector 122 checks the message received from bus 130 against the determination rule to perform anomaly detection on the message. Specifically, in the case where the transmission period of the message flowing in bus 130 is anomalous or an instruction value included in the message flowing in bus 130 is anomalous based on the determination rule, anomaly detector 122 detects the message as an anomalous message.

In the case where the message received by communication section 121 is detected as an anomalous message by anomaly detector 122, IDS ECU 120 transmits anomalous ID information indicating an anomalous ID included in the message to each anomaly detection device (anomaly detection devices 110a, 110b, 110d, and 110f in the example in FIG. 3) in in-vehicle network 100 from communication section 121 via bus 130. Thus, each anomaly detection device can recognize the anomalous ID.

[1-7. Structure of Anomaly Detection Device]

FIG. 7 is a block diagram of anomaly detection device 110a. FIG. 7 illustrates ECU 101a and bus 130 directly connected to anomaly detection device 110a, in addition to anomaly detection device 110a. This embodiment mainly describes anomaly detection device 110a from among the plurality of anomaly detection devices.

Anomaly detection device 110a is located between bus 130 and ECU 101a.

Anomaly detection device 110a includes communication section 111, controller 112, transmitted ID list holder 113, and received ID list holder 114. Anomaly detection device 110a is, for example, a device including digital circuits such as a processor and memory, analog circuits, and communication circuits. The memory is, for example, ROM or RAM, and can store a program executed by the processor. For example, controller 112 in anomaly detection device 110a is implemented by the processor operating according to the program. Communication section 111 is, for example, implemented by the communication circuits. Transmitted ID list holder 113 and received ID list holder 114 are, for example, implemented by the memory.

Communication section 111 is a communication circuit that receives a message from ECU 101a and transmits the message to bus 130, and receives a message from bus 130 and transmits the message to ECU 101a. Communication section 111 has a function of relaying a message transmitted from bus 130 to ECU 101a and a message transmitted from ECU 101a to bus 130.

Transmitted ID list holder 113 holds a transmitted ID list which is a list of IDs of messages that communication section 111 has received from ECU 101a and transmitted to bus 130. The transmitted ID list will be described later.

Received ID list holder 114 holds a received ID list which is a list of IDs of messages that communication section 111 has received from bus 130 and transmitted to ECU 101a. The received ID list will be described later.

Controller 112 controls communication section 111, transmitted ID list holder 113, and received ID list holder 114. Controller 112 performs the following processes (described in detail later).

In the case where an ID of a message received by communication section 111 from bus 130 is not included in the received ID list, controller 112 adds the ID to the received ID list. In the case where an ID of a message received by communication section 111 from ECU 101a is included in the received ID list, controller 112 does not transmit the message to bus 130. For example, in the case where the ID of the message received by communication section 111 from ECU 101a is included in the received ID list, controller 112 isolates ECU 101a from bus 130.

In the case where communication section 111 receives, from bus 130, anomalous ID information indicating an anomalous ID transmitted from another ECU (specifically, IDS ECU 120) from among the plurality of ECUs, controller 112 erases the ID indicated by the anomalous ID information from the received ID list.

Moreover, when communication section 111 receives a message from bus 130, controller 112 updates the number of received messages recorded for the ID of the message. When vehicle 10 including in-vehicle network 100 shuts down, controller 112 saves, from among the IDs included in the received ID list, each ID for which the number of received messages recorded in received ID list holder 114 or the frequency of received messages based on the number of received messages is less than or equal to a predetermined value to nonvolatile memory. When vehicle 10 starts, controller 112 adds each ID saved to the nonvolatile memory, to the received ID list. In the case where firmware information of ECU 101a has been changed since vehicle 10 last started, when vehicle 10 starts, controller 112 erases each ID saved to the nonvolatile memory, without adding the ID to the received ID list.

In the case where an ID of a message received from ECU 101a is not included in the transmitted ID list, controller 112 adds the ID to the transmitted ID list. In the case where an ID of a message received by communication section 111 from bus 130 is included in the transmitted ID list, controller 112 does not transmit the message to ECU 101a.

Moreover, when communication section 111 receives a message from ECU 101a, controller 112 updates the number of transmitted messages recorded for the ID of the message. When vehicle 10 including in-vehicle network 100 shuts down, controller 112 saves, from among the IDs included in the transmitted ID list, each ID for which the number of transmitted messages recorded in transmitted ID list holder 113 or the frequency of transmitted messages based on the number of transmitted messages is less than or equal to a predetermined value to the nonvolatile memory. When vehicle 10 starts, controller 112 adds each ID saved to the nonvolatile memory, to the transmitted ID list. In the case where the firmware information of ECU 101a has been changed since vehicle 10 last started, when vehicle 10 starts, controller 112 erases each ID saved to the nonvolatile memory, without adding the ID to the transmitted ID list.

Anomaly detection devices 110b, 110c, 110d, 110e, and 110f each have the same structure as anomaly detection device 110a, and their description is omitted because the same description as anomaly detection device 110a applies. The only difference is that the respective ECUs connected to anomaly detection devices 110b, 110c, 110d, 110e, and 110f are ECUs 101b, 101c, 101d, 101e, and 101f.

[1-8. Structure of ECU Having Anomaly Detection Function]

Figures 8, 9, 10:
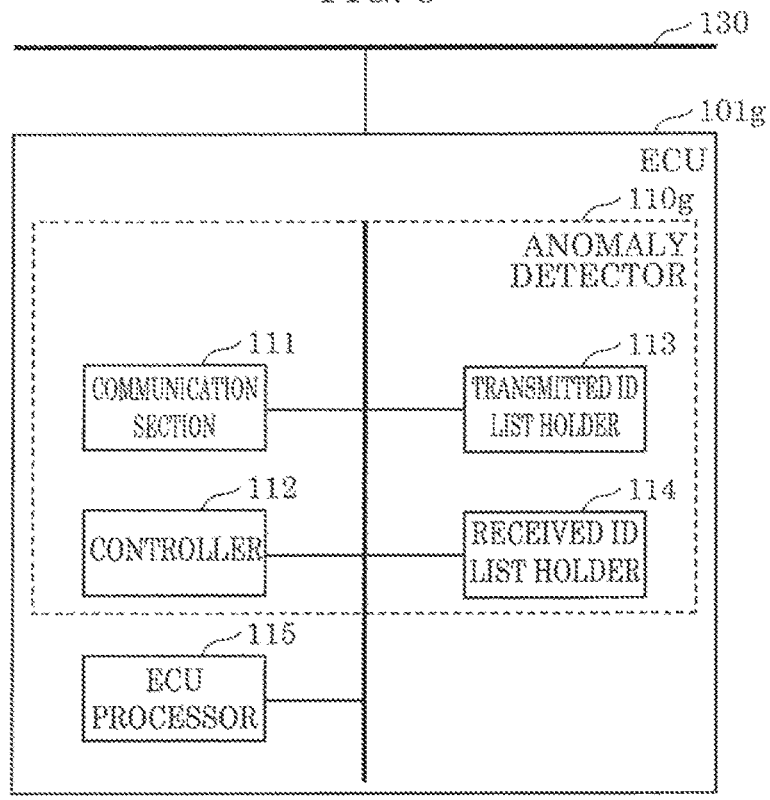
FIG. 8 is a block diagram of an ECU having an anomaly detection function in Embodiment 1.
FIG. 9 is a diagram illustrating an example of a received ID list in Embodiment 1.
FIG. 10 is a diagram illustrating an example of a transmitted ID list in Embodiment 1.

FIG. 8 is a block diagram of ECU 101g having an anomaly detection function. In FIG. 8, anomaly detection device 110a illustrated in FIG. 7 is implemented in ECU 101g. Specifically, the functions of anomaly detection device 110a are implemented by anomaly detector 110g, and the functions of ECU 101a such as a function of performing processes relating to vehicle control are implemented by ECU processor 115. In this case, anomaly detector 110g (corresponding to anomaly detection device 110a) is located between bus 130 and ECU processor 115 (corresponding to ECU 101a). As illustrated in FIG. 8, the anomaly detection function may be directly implemented in the ECU.

[1-9. Example of Received ID List]

FIG. 9 is a diagram illustrating an example of the received ID list. The received ID list is held in received ID list holder 114. Received ID list holder 114 has a region for recording IDs of messages received by ECU 101a connected to anomaly detection device 110a and the number of received messages for each ID included in the received ID list. In other words, the received ID list includes each of the IDs of the messages received by ECU 101a connected to anomaly detection device 110a, the number of received messages including the ID after vehicle 10 starts, and the frequency of received messages based on the number of received messages. For example, the frequency of received messages indicates the number of received messages for the last 1 minute. Herein, a "message received by ECU 101a" is a message that anomaly detection device 110a has received from bus 130 and transmitted to ECU 101a. Controller 112 controls received ID list holder 114 to update these information in the received ID list. Specifically, when communication section 111 receives a message from bus 130 and transmits the message to ECU 101a, controller 112 adds an ID included in the message to the received ID list. Controller 112 also counts, for each of IDs included in messages, the number of times a message has been transmitted to ECU 101a after vehicle 10 starts, and updates the number of times ECU 101a has received the message. Controller 112 also updates, for example, the number of received messages for the last 1 minute, per minute.

In FIG. 9, for each of respective messages with 0x25, 0x27, and 0x89 as IDs, the number of received messages and the number of received messages for the last 1 minute are held in received ID list holder 114.

Although the number of received messages for the last 1 minute is illustrated in FIG. 9, received ID list holder 114 may be configured to hold the number of received messages for the last 30 minutes, the last 1 hour, or the like, or a number obtained by dividing the number of received messages after the vehicle starts by the time after the vehicle starts.

[1-10. Example of Transmitted ID List]

FIG. 10 is a diagram illustrating an example of the transmitted ID list. The transmitted ID list is held in transmitted ID list holder 113. Transmitted ID list holder 113 has a region for recording IDs of messages transmitted by ECU 101a connected to anomaly detection device 110a and the number of transmitted messages for each ID included in the transmitted ID list. In other words, the transmitted ID list includes each of the IDs of the messages transmitted by ECU 101a connected to anomaly detection device 110a, the number of transmitted messages including the ID after vehicle 10 starts, and the frequency of transmitted messages based on the number of transmitted messages. For example, the frequency of transmitted messages indicates the number of transmitted messages for the last 1 minute. Herein, a "message transmitted by ECU 101a" is a message that anomaly detection device 110a has received from ECU 101a and transmitted to bus 130. Controller 112 controls transmitted ID list holder 113 to update these information in the transmitted ID list. Specifically, when communication section 111 receives a message from ECU 101a and transmits the message to bus 130, controller 112 adds an ID included in the message to the transmitted ID list. Controller 112 also counts, for each of IDs included in messages, the number of times a message has been transmitted to bus 130 after vehicle 10 starts, and updates the number of times ECU 101a has transmitted the message. Controller 112 also updates, for example, the number of transmitted messages for the last 1 minute, per minute.

In FIG. 10, for each of respective messages with 0x253, 0x272, and 0x349 as IDs, the number of transmitted messages and the number of transmitted messages for the last 1 minute are held in transmitted ID list holder 113.

Although the number of transmitted messages for the last 1 minute is illustrated in FIG. 10, transmitted ID list holder 113 may be configured to hold the number of transmitted messages for the last 30 minutes, the last 1 hour, or the like.

[1-11. Received ID List Update Process Sequence]

Figure 11:
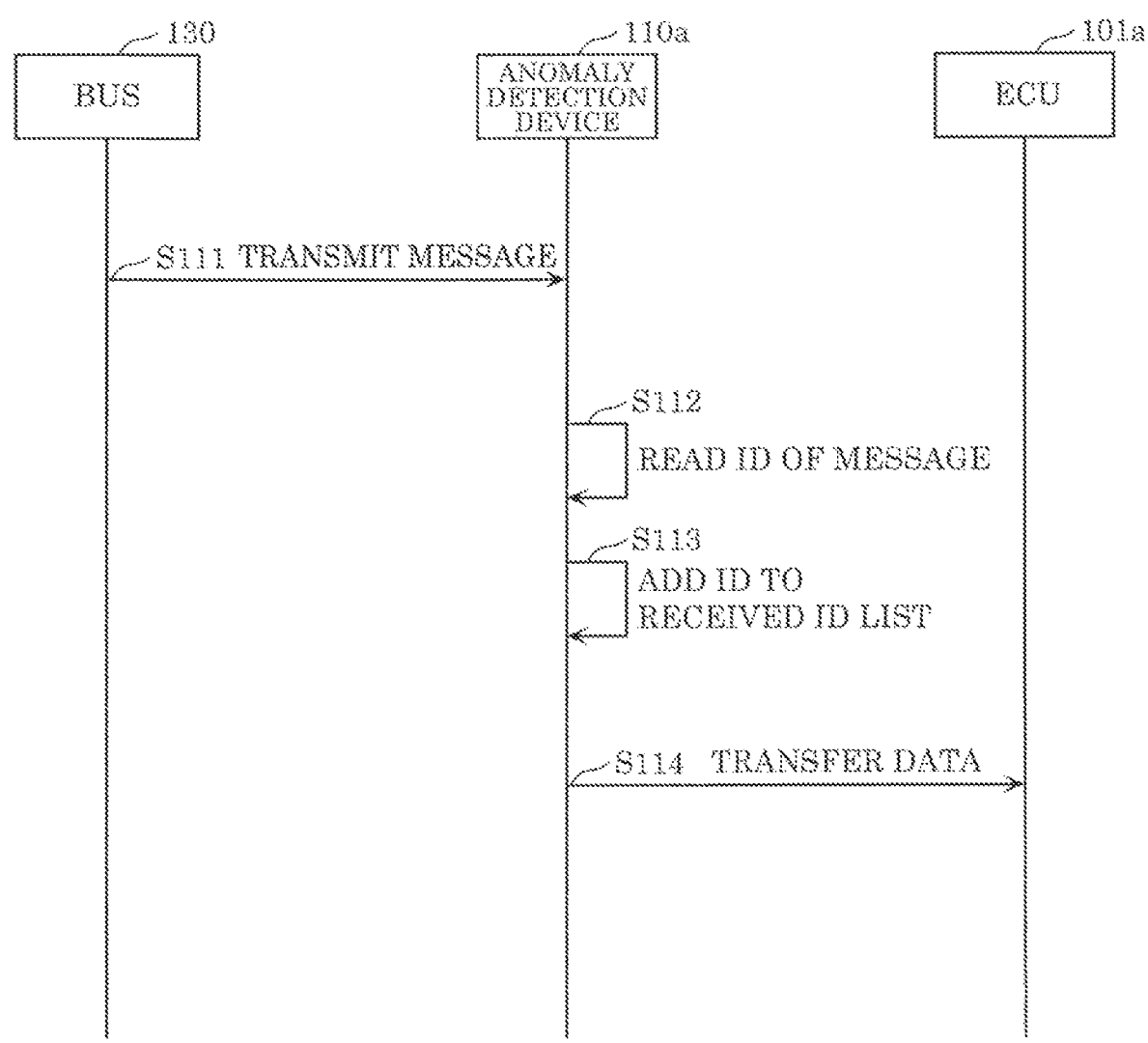
FIG. 11 is a diagram illustrating sequence of a received ID list update process in Embodiment 1.

FIG. 11 is a diagram illustrating sequence of a received ID list update process. FIG. 11 illustrates an example of sequence of a received ID list update process in the case where anomaly detection device 110a receives a message of an ID not included in the received ID list from bus 130.

In Step S111, a message is transmitted from bus 130 to anomaly detection device 110a.

In Step S112, anomaly detection device 110a reads the ID of the message received from bus 130.

In Step S113, anomaly detection device 110a determines whether the ID read in Step S112 is included in the received ID list, and, in the case of determining that the read ID is not included in the received ID list, adds the read ID to the received ID list.

In Step S114, anomaly detection device 110a transfers the message received from bus 130 to ECU 101a.

Thus, anomaly detection device 110a adds an ID of a message received from bus 130 to the received ID list. That is, anomaly detection device 110a adds an ID of a message that an ECU other than ECU 101a connected to bus 130 via anomaly detection device 110a from among the plurality of ECUs transmits to bus 130, to the received ID list. Under the specifications that a plurality of ECUs in in-vehicle network 100 do not transmit messages including the same ID, the received ID list is a list of IDs of messages not transmitted by ECU 101a.

[1-12. Anomaly Detection Process Sequence Using Received ID List]

Figure 12:
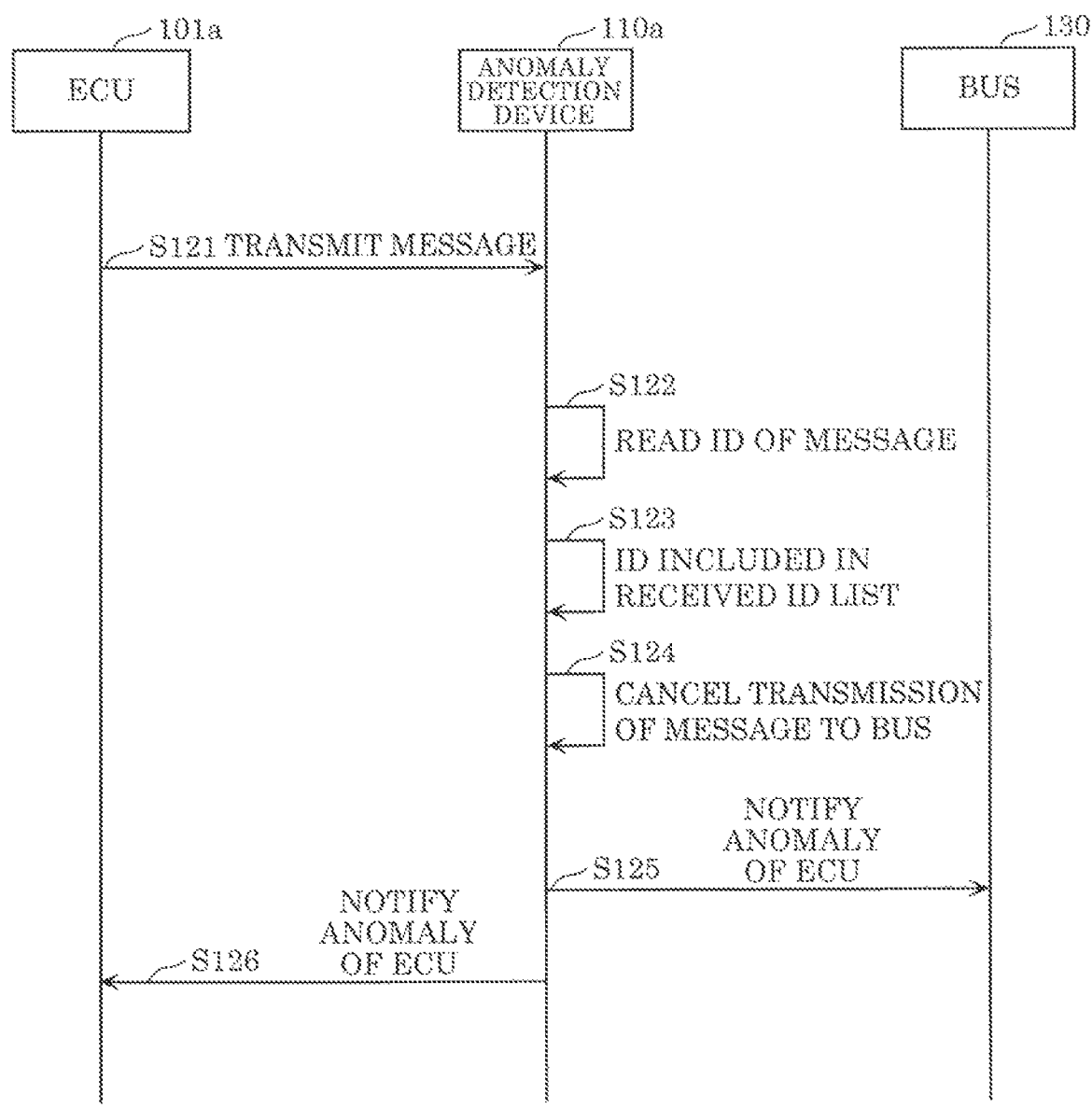
FIG. 12 is a diagram illustrating sequence of an anomaly detection process using the received ID list in Embodiment 1.

FIG. 12 is a diagram illustrating sequence of an anomaly detection process using the received ID list. FIG. 12 illustrates an example of sequence in the case where ECU 101a transmits a message of an ID included in the received ID list (i.e. a message not to be transmitted by ECU 101a).

In Step S121, a message is transmitted from ECU 101a to anomaly detection device 110a. Anomaly detection device 110a receives the message transmitted from ECU 101a.

In Step S122, anomaly detection device 110a reads the ID of the received message.

In Step S123, anomaly detection device 110a determines whether the ID read in Step S122 is included in the received ID list, and determines that the read ID is included in the received ID list. This means the message that is supposed to be not transmitted by ECU 101a is transmitted by ECU 101a. That is, ECU 101a transmits an anomalous message.

In Step S124, anomaly detection device 110a cancels transmission of the message transmitted by ECU 101a to bus 130. By not transmitting the message from ECU 101a to bus 130, the anomalous message can be kept from flowing in bus 130.

In Step S125, anomaly detection device 110a notifies bus 130 that ECU 101a is anomalous, to notify each node other than ECU 101a connected to bus 130 that ECU 101a is anomalous. For example, each node other than ECU 101a, as a result of recognizing that ECU 101a is anomalous, can perform an appropriate process depending on the function of ECU 101a. For example, in the case where ECU 101a relates to driving of vehicle 10, each node can perform such a process that stops vehicle 10.

In Step S126, anomaly detection device 110a notifies ECU 101a that ECU 101a is anomalous. ECU 101a, as a result of recognizing that ECU 101a is anomalous, can start a fail-safe function as an example, although this depends on the degree of anomaly of ECU 101a.

[1-13. Transmitted ID List Update Process Sequence]

Figure 13:
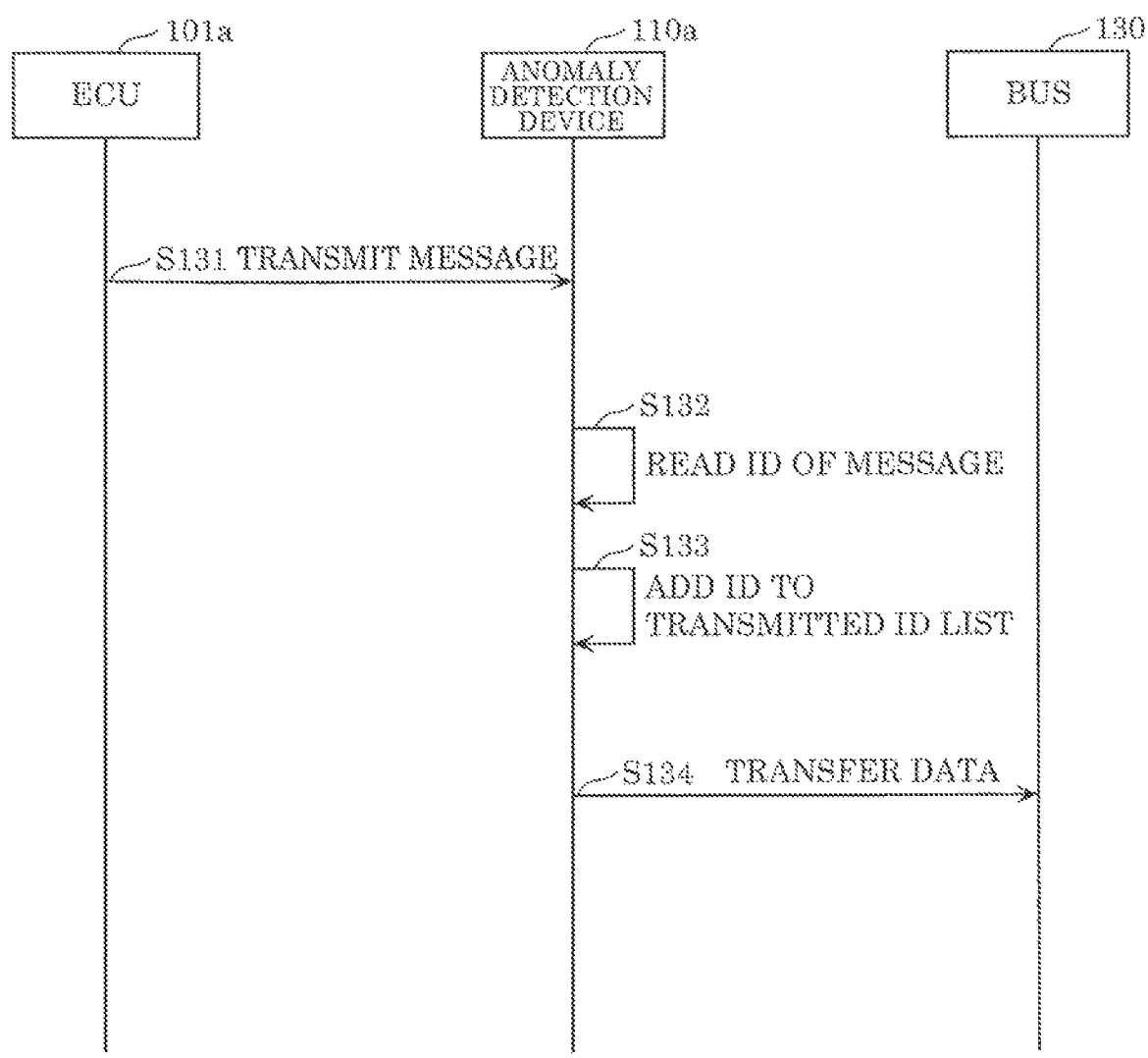
FIG. 13 is a diagram illustrating sequence of a transmitted ID list update process in Embodiment 1.

FIG. 13 is a diagram illustrating sequence of a transmitted ID list update process. FIG. 13 illustrates an example of sequence of a transmitted ID list update process in the case where anomaly detection device 110a receives a message of an ID not included in the transmitted ID list from ECU 101a connected to anomaly detection device 110a.

In Step S131, a message is transmitted from ECU 101a to anomaly detection device 110a.

In Step S132, anomaly detection device 110a receives the message transmitted by ECU 101a, and reads the ID of the message.

In Step S133, anomaly detection device 110a determines whether the ID read in Step S132 is included in the transmitted ID list, and, in the case of determining that the read ID is not included in the transmitted ID list, adds the read ID to the transmitted ID list.

In Step S134, anomaly detection device 110a transfers the message received from ECU 101a to but 130.

Thus, anomaly detection device 110a adds an ID of a message received from ECU 101a to the transmitted ID list. That is, anomaly detection device 110a adds an ID of a message that ECU 101a connected to bus 130 via anomaly detection device 110a from among the plurality of ECUs transmits to bus 130, to the transmitted ID list. Under the specifications that a plurality of ECUs in in-vehicle network 100 do not transmit messages including the same ID, the transmitted ID list is a list of IDs of messages not transmitted by any ECU or the like other than ECU 101a.

[1-14. Anomaly Detection Process Sequence Using Transmitted ID List]

Figure 14:
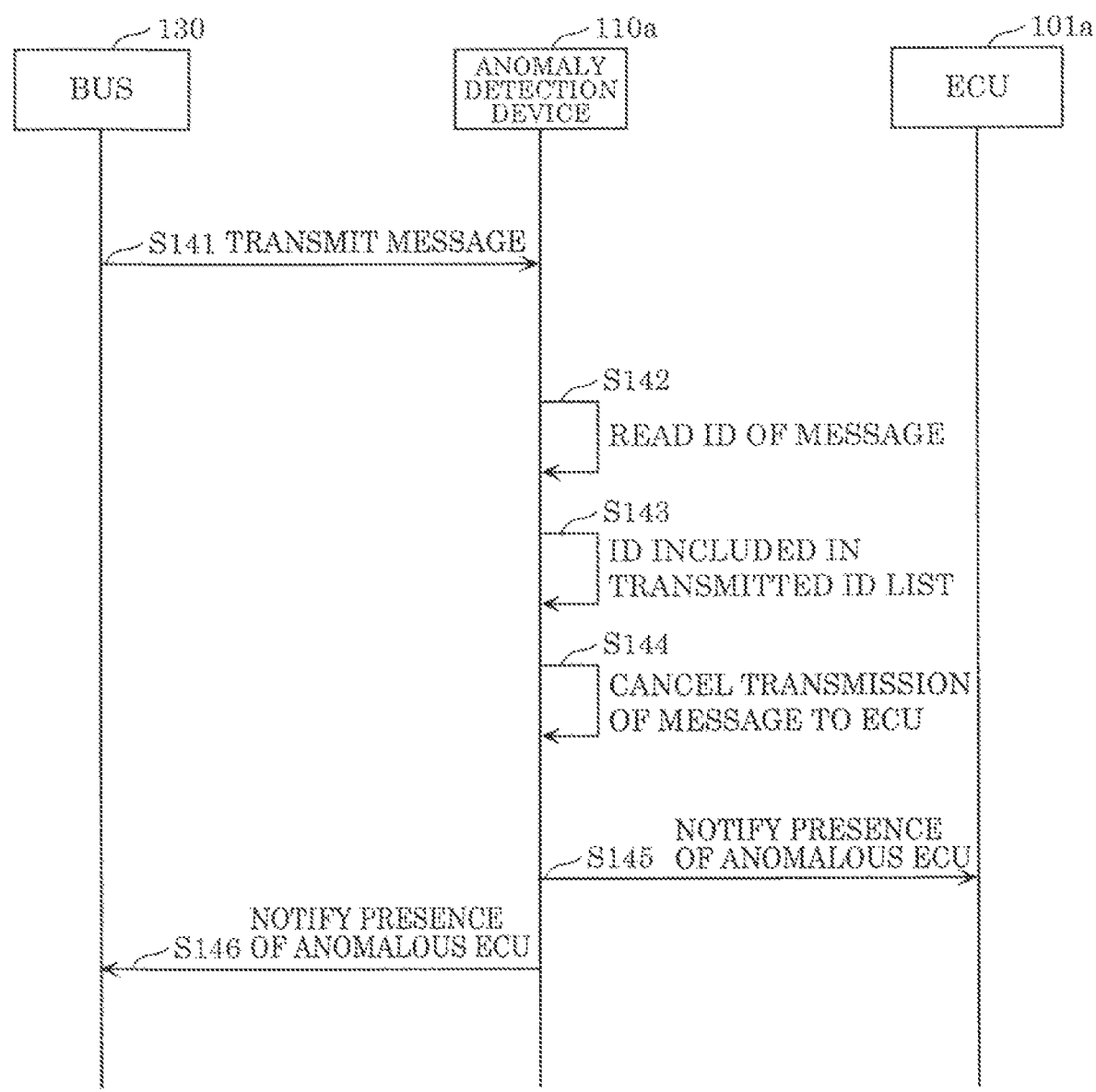
FIG. 14 is a diagram illustrating sequence of an anomaly detection process using the transmitted ID list in Embodiment 1.

FIG. 14 is a diagram illustrating sequence of an anomaly detection process using the transmitted ID list. FIG. 14 illustrates an example of sequence in the case where a message of an ID included in the transmitted ID list (i.e. a message not to be transmitted by an ECU or the like other than ECU 101a) is transmitted to bus 130.

In Step S141, a message is transmitted from bus 130 to anomaly detection device 110a. Anomaly detection device 110a receives the message transmitted from bus 130.

In Step S142, anomaly detection device 110a reads the ID of the received message.

In Step S143, anomaly detection device 110a determines whether the ID read in Step S142 is included in the transmitted ID list, and determines that the read ID is included in the transmitted ID list. This means the message that is supposed to be not transmitted by an ECU or the like other than ECU 101a is transmitted by an ECU or the like other than ECU 101a. That is, an ECU or the like other than ECU 101a transmits an anomalous message.

In Step S144, anomaly detection device 110a cancels transmission of the message transmitted by bus 130 to ECU 101a. By not transmitting the message from an ECU or the like other than ECU 101a to ECU 101a, the anomalous message can be kept from being transmitted to ECU 101a.

In Step S145, anomaly detection device 110a notifies ECU 101a that an anomalous ECU or the like is present in in-vehicle network 100. For example, because an anomalous ECU or the like transmits an unauthorized message using an ID included in a message transmitted by ECU 101a, there is a possibility that the anomalous ECU or the like attempts to impersonate ECU 101a. ECU 101a can accordingly perform an appropriate process depending on its function. For example, in the case where ECU 101a relates to driving of vehicle 10, ECU 101a can perform such a process that stops vehicle 10.

In Step S146, anomaly detection device 110a notifies bus 130 that an anomalous ECU or the like is present in in-vehicle network 100. That is, anomaly detection device 110a notifies ECUs 101b, 101c, 101d, 101e, and 101f other than ECU 101a connected to bus 130 that an anomalous ECU or the like is present in in-vehicle network 100. Each ECU can accordingly perform an appropriate process depending on the function of ECU 101a.

[1-15. Sequence in the Case where IDS ECU Detects Anomaly]

The description with regard to FIGS. 11 to 14 is based on an assumption that the IDs included in the transmitted ID list and the IDs included in the received ID list are authorized IDs. This is because, basically, transmission of a message from each ECU is started as soon as vehicle 10 starts and authorized IDs are soon added to the transmitted ID list and the received ID list.

However, there is also a possibility that, before authorized IDs are added to the transmitted ID list and the received ID list after vehicle 10 starts, an anomalous ID is added to the transmitted ID list or the received ID list through an attack by an attacker.

A process in the case where an anomalous ID (e.g. an ID included in an authorized message transmitted by ECU 101a) is added to the received ID list in anomaly detection device 110a before any authorized ID is added will be described below.

Figure 15:
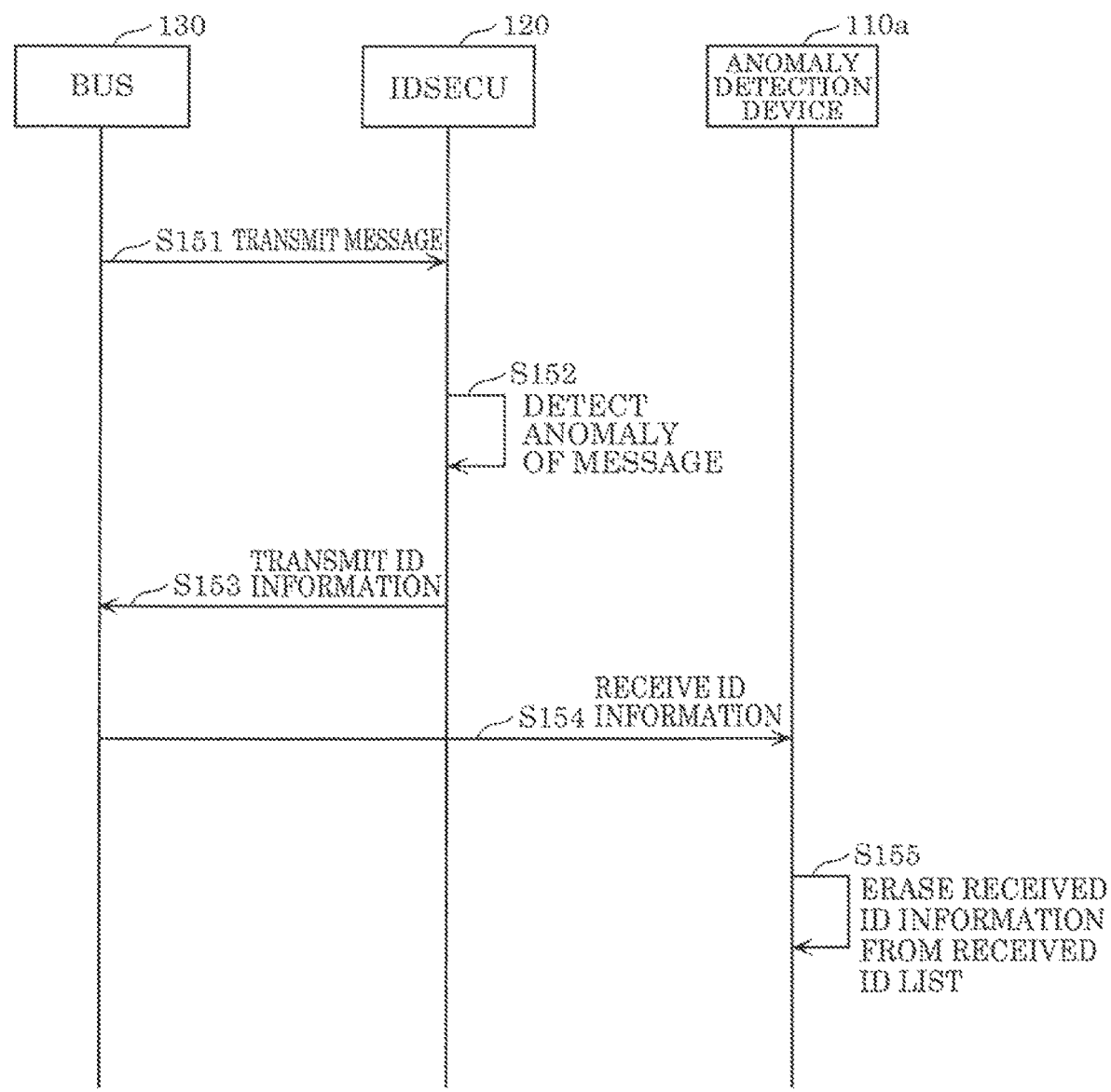
FIG. 15 is a diagram illustrating process sequence in the case where the IDS ECU detects an anomaly in Embodiment 1.

FIG. 15 is a diagram illustrating sequence of a process in the case where IDS ECU 120 detects an anomaly. FIG. 15 illustrates an example of sequence of a process in the case where IDS ECU 120 is included in in-vehicle network 100 as illustrated in FIG. 3 and detects an anomaly. In the case where IDS ECU 120 detects an anomaly, the anomalous ID included in the detected anomalous message is erased from the received ID list held in anomaly detection device 110a.

In Step S151, a message is transmitted from bus 130 to IDS ECU 120.

In Step S152, IDS ECU 120 performs anomaly determination on the received message, and determines that the received message is anomalous.

In Step S153, IDS ECU 120 transmits anomalous ID information indicating the anomalous ID of the message determined as anomalous, to bus 130.

In Step S154, anomaly detection device 110a connected to bus 130 receives the anomalous ID information about the message determined as anomalous in IDS ECU 120, which has been transmitted to bus 130. The anomalous ID information about the message determined as anomalous in IDS ECU 120 is transmitted to all anomaly detection devices connected to bus 130, i.e. anomaly detection devices 110a, 110b, 110d, and 110f.

In Step S155, anomaly detection device 110a erases the ID of the message determined as anomalous in IDS ECU 120 (i.e. the ID indicated by the anomalous ID information), from the received ID list.

Thus, even in the case where an attacker transmits an unauthorized message to bus 130 before an authorized message flows in bus 130, by erasing the ID included in the unauthorized message (e.g. the ID included in the message transmitted by ECU 101a) added to the received ID list from the received ID list to correct the received ID list, anomaly detection device 110a can be prevented from erroneously detecting an authorized message (e.g. a message transmitted by authorized ECU 101a) as an unauthorized message. In other words, since an ID included in a message transmitted by authorized ECU 101a is no longer included in the received ID list, authorized ECU 101a can transmit the message to bus 130.

[6. Overall Process Flow of Anomaly Detection Device]

Figure 16:
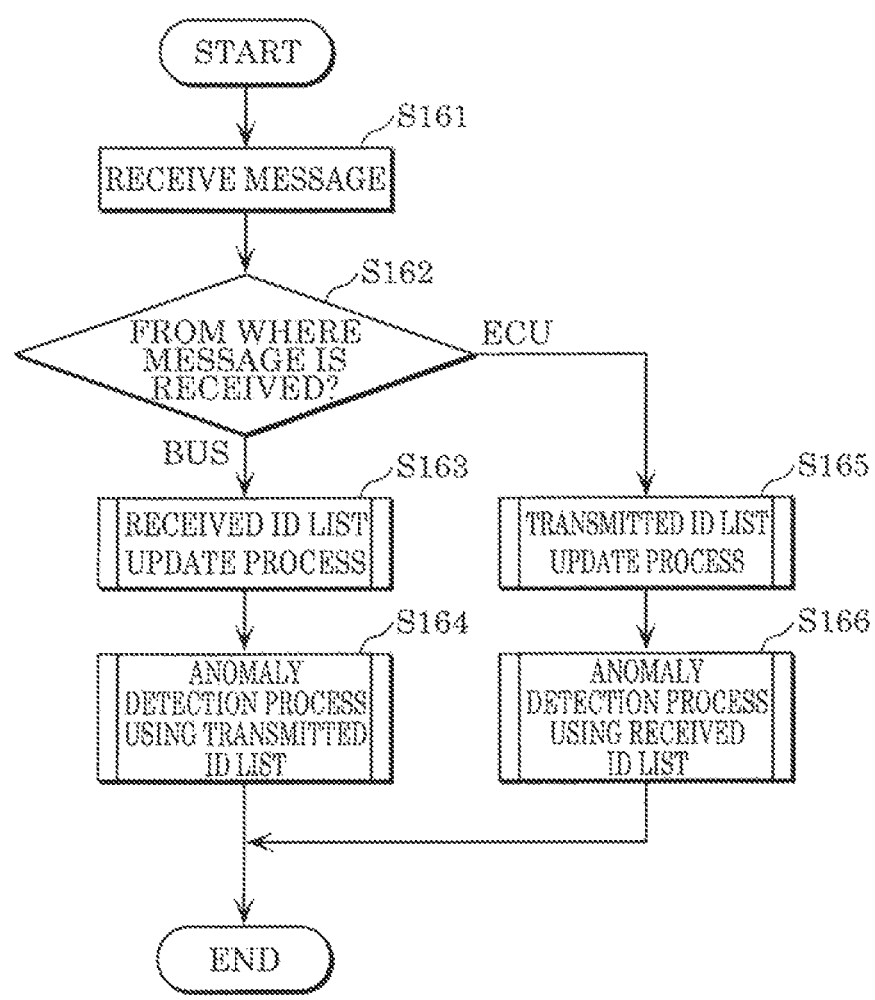
FIG. 16 is a flowchart of an overall process of the anomaly detection device in Embodiment 1.

FIG. 16 is a flowchart of an overall process of anomaly detection device 110a in Embodiment 1. Anomaly detection device 110a receives a message transmitted/received between ECU 101a connected to anomaly detection device 110a and bus 130, and updates the received ID list or the transmitted ID list and performs anomaly determination on the message depending on whether the message is transmitted from bus 130 to ECU 101a or transmitted from ECU 101a to bus 130. In the case where an anomaly is detected, anomaly detection device 110a cancels transfer of the message to ECU 101a or bus 130.

In Step S161, anomaly detection device 110a receives a message from bus 130 or ECU 101a connected to anomaly detection device 110a.

In Step S162, anomaly detection device 110a determines whether the received message is transmitted from ECU 101a or transmitted from bus 130. For example, anomaly detection device 110a may have an input-output terminal connected to ECU 101a and an input-output terminal connected to bus 130, and perform the determination depending on from which input-output terminal the message is received.

Steps S163 and S164 correspond to a process in the case where the received message is transmitted from bus 130 (Step S162: "bus"), and anomaly detection device 110a performs a received ID list update process and an anomaly detection process using the transmitted ID list.

Steps S165 and S166 correspond to a process in the case where the received message is transmitted from ECU 101a (Step S162: "ECU"), and anomaly detection device 110a performs a transmitted ID list update process and an anomaly detection process using the received ID list.

Step S163 will be described below with reference to FIG. 17. Step S164 will be described below with reference to FIG.

21. Step S165 will be described below with reference to FIG. 18. Step S166 will be described below with reference to FIGS. 19 and 20.

[1-17. Received ID List Update Process Flow]

Figure 17:
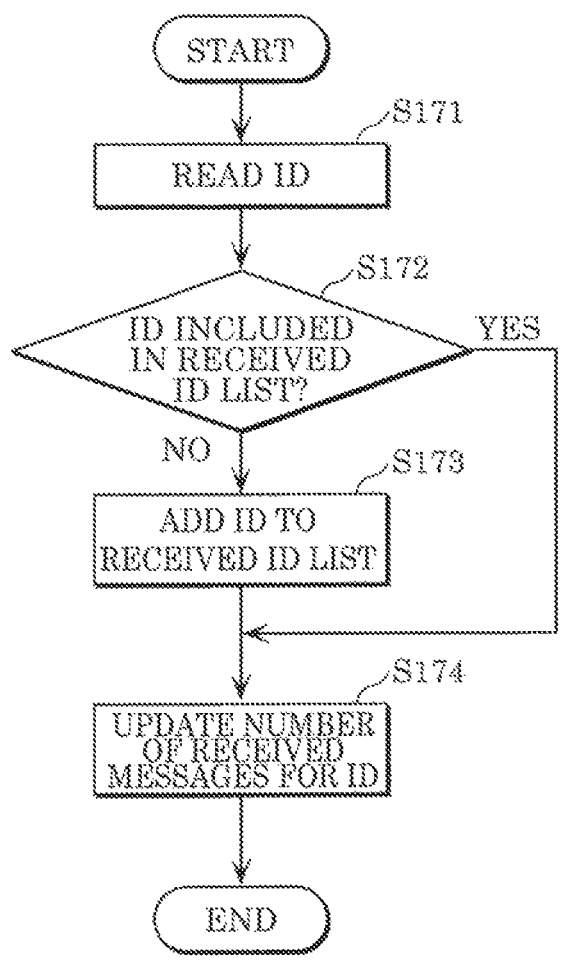
FIG. 17 is a flowchart of a received ID list update process in Embodiment 1.

FIG. 17 is a flowchart of a received ID list update process. FIG. 17 illustrates detailed process flow of the received ID list update process in Step S163 in FIG. 16. When a message is transmitted from bus 130, anomaly detection device 110a updates the received ID list held in received ID list holder 114.

In Step S171, anomaly detection device 110a reads the ID of the message received from bus 130.

In Step S172, anomaly detection device 110a determines whether the ID read in Step S171 is included in the received ID list.

In the case where the read ID is not included in the received ID list (Step S172: NO), anomaly detection device 110a adds the read ID to the received ID list in Step S173. In the case where the read ID is included in the received ID list (Step S172: YES), anomaly detection device 110a performs a process in Step S174.

In Step S174, anomaly detection device 110a increments the number of received messages recorded in received ID list holder 114 for the read ID to update the number of received messages.

[1-18. Transmitted ID List Update Process Flow]

Figure 18:
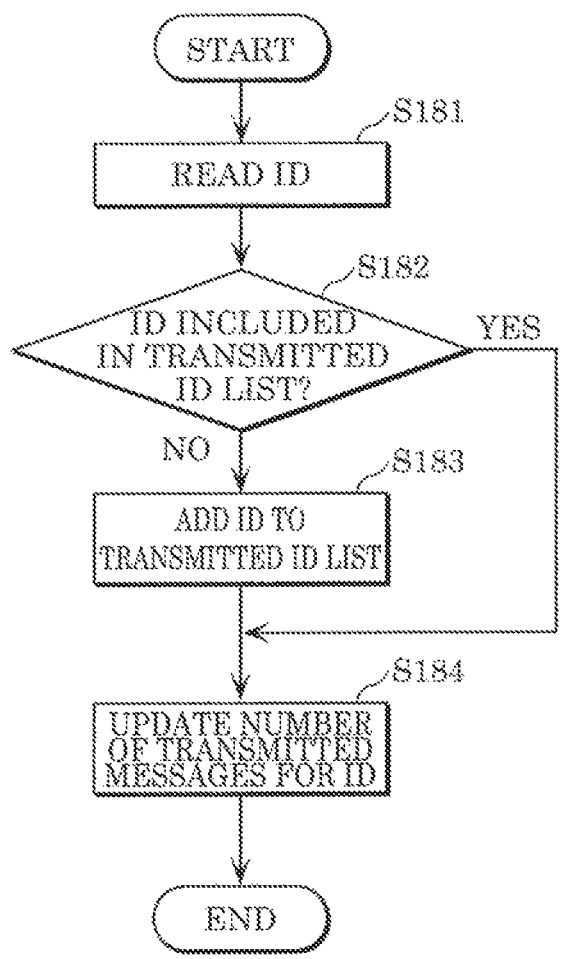
FIG. 18 is a flowchart of a transmitted ID list update process in Embodiment 1.

FIG. 18 is a flowchart of a transmitted ID list update process. FIG. 18 illustrates detailed process flow of the transmitted ID list update process in Step S165 in FIG. 16. When a message is transmitted from ECU 101a, anomaly detection device 110a updates the transmitted ID list held in transmitted ID list holder 113.

In Step S181, anomaly detection device 110a reads the ID of the message received from ECU 101a.

In Step S182, anomaly detection device 110a determines whether the ID read in Step S181 is included in the transmitted ID list.

In the case where the read ID is not included in the transmitted ID list (Step S182: NO), anomaly detection device 110a adds the read ID to the transmitted ID list in Step S183. In the case where the read ID is included in the transmitted ID list (Step S182: YES), anomaly detection device 110a performs a process in Step S184.

In Step S184, anomaly detection device 110a increments the number of transmitted messages recorded in transmitted ID list holder 113 for the read ID to update the number of transmitted messages.

[1-19. Anomaly Detection Process Flow Using Received ID List]

Figure 19:
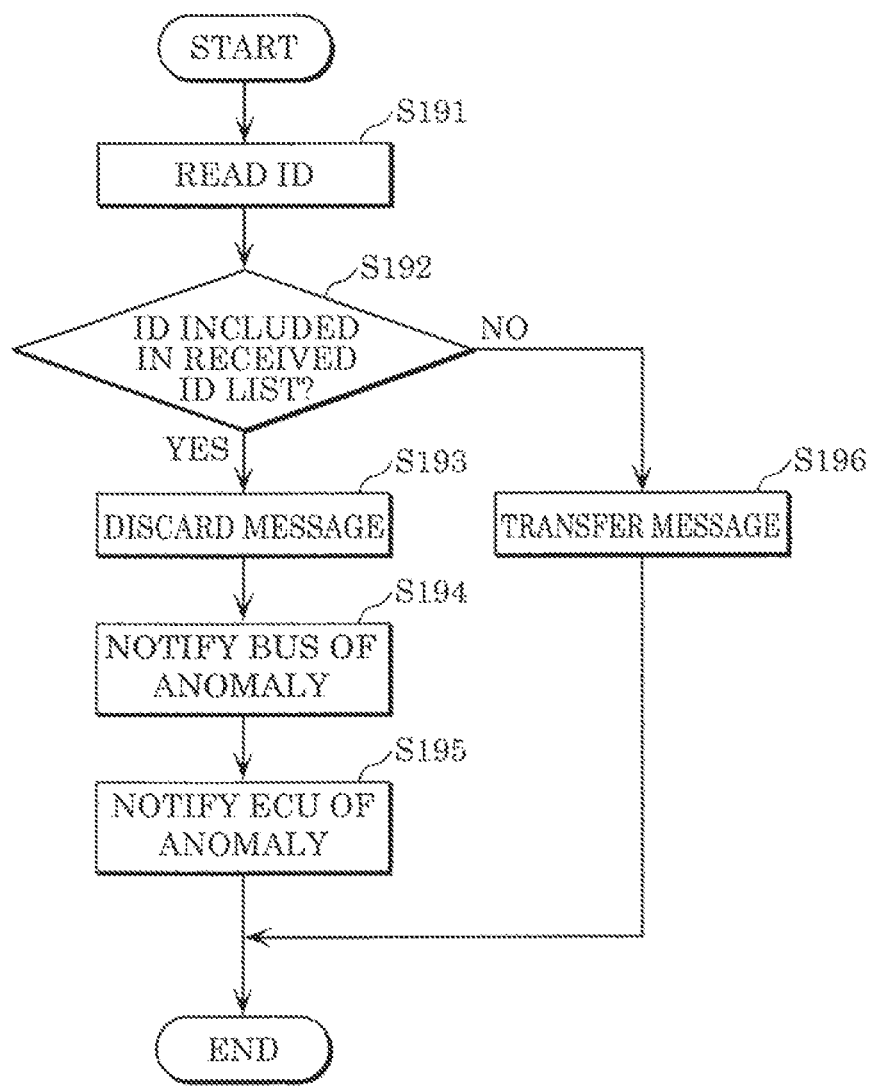
FIG. 19 is a flowchart of an anomaly detection process using the received ID list in Embodiment 1.

FIG. 19 is a flowchart of an anomaly detection process using the received ID list. FIG. 19 illustrates detailed process flow of the anomaly detection process for ECU 101a connected to anomaly detection device 110a using the received ID list in Step S166 in FIG. 16.

In Step S191, anomaly detection device 110a reads the ID of the message received from ECU 101a.

In Step S192, anomaly detection device 110a determines whether the read ID is included in the received ID list.

In the case where the read ID is included in the received ID list (Step S192: YES), anomaly detection device 110a detects the message received from ECU 101a as an anomalous message, and performs processes in Steps S193, S194, and S195. In the case where the read ID is not included in the received ID list (Step S192: NO), anomaly detection device 110a detects the message received from ECU 101a as a normal message, and performs a process in Step S196.

In Step S193, anomaly detection device 110a discards the received message. That is, anomaly detection device 110a does not transmit the message received from ECU 101a, to bus 130. By not transmitting the message from ECU 101a to bus 130, the anomalous message can be kept from flowing in bus 130.

In Step S194, anomaly detection device 110a notifies bus 130 that ECU 101a is anomalous.

In Step S195, anomaly detection device 110a notifies ECU 101a that ECU 101a is anomalous.

In Step S196, as the message received from ECU 101a is normal, anomaly detection device 110a transfers the message to bus 130.

[1-20. Anomaly Detection Process Flow Using Received ID List (Variation)]

Figure 20:
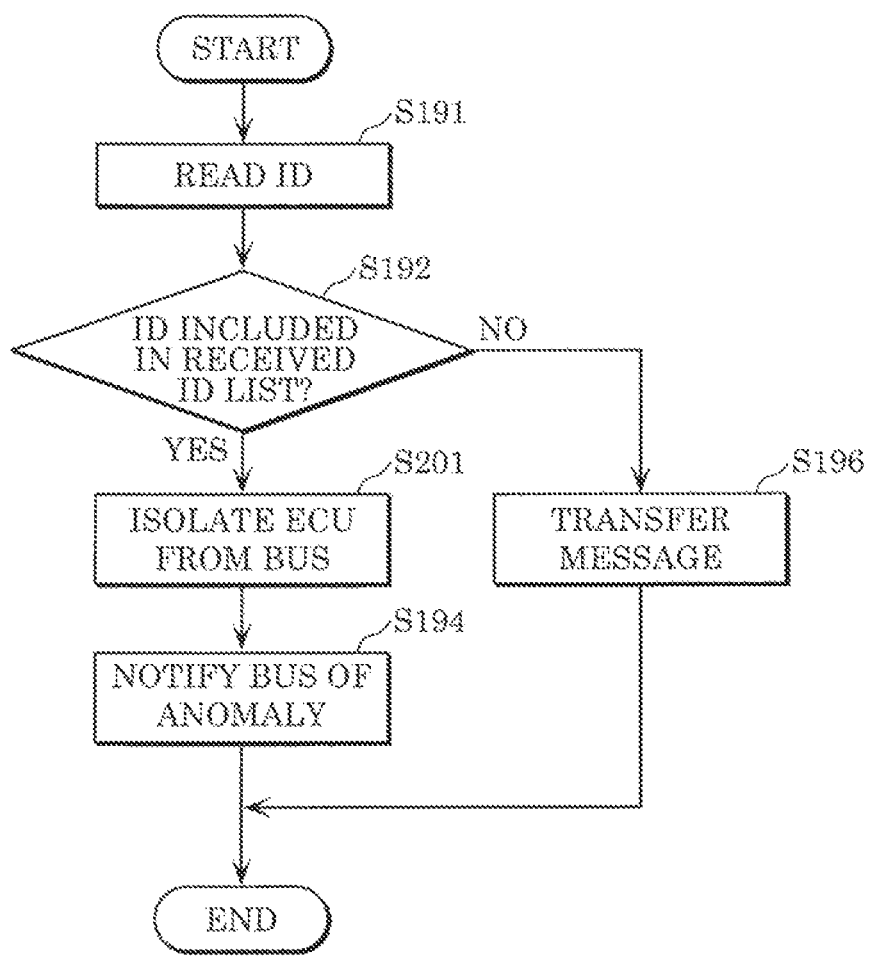
FIG. 20 is a flowchart of a variation of the anomaly detection process using the received ID list in Embodiment 1.

FIG. 20 is a flowchart of a variation of the anomaly detection process using the received ID list. FIG. 20 illustrates detailed process flow of the variation of the anomaly detection process using the received ID list in Step S166 in FIG. 16. In the anomaly detection process using the received ID list in FIG. 19, in the case where the ID of the received message is included in the received ID list, anomaly detection device 110a discards the received message in Step S193, without transferring it to bus 130. In the variation in FIG. 20, a process in Step S201 is performed instead of the process in Step S193. Specifically, anomaly detection device 110a isolates ECU 101a from bus 130. More specifically, anomaly detection device 110a blocks all messages received from ECU 101a. By isolating ECU 101a from bus 130 to prevent the spread of damage, in-vehicle network 100 can be less affected by the unauthorized ECU than in the case where only the anomalous message is blocked. For example, a switch for connection and disconnection between anomaly detection device 110a and ECU 101a may be provided between anomaly detection device 110a and ECU 101a, and operated to disconnect anomaly detection device 110a and ECU 101a from each other and thus isolate ECU 101a from bus 130.

[1-21. Anomaly Detection Process Flow Using Transmitted ID List]

Figure 21:
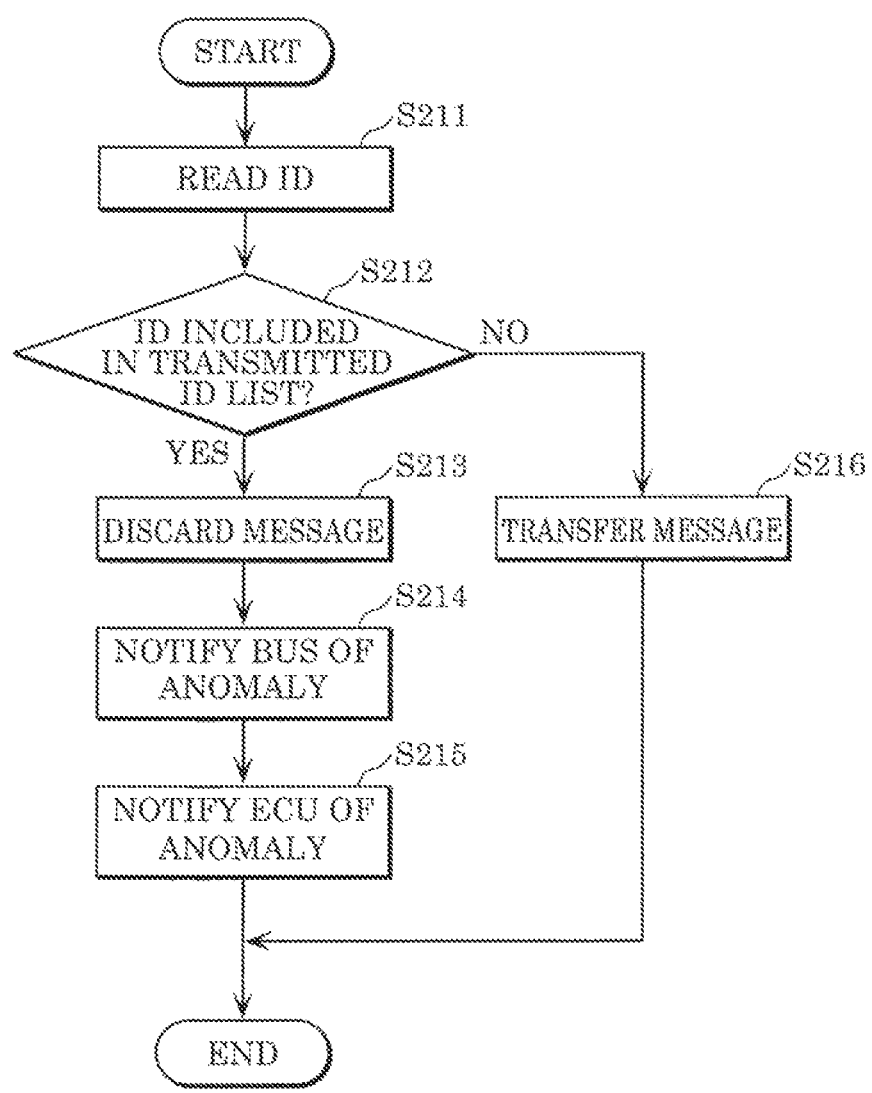
FIG. 21 is a flowchart of an anomaly detection process using the transmitted ID list in Embodiment 1.

FIG. 21 is a flowchart of an anomaly detection process using the transmitted ID list. FIG. 21 illustrates detailed process flow of the anomaly detection process for an ECU connected to bus 130 using the transmitted ID list in Step S164 in FIG. 16.

In Step S211, anomaly detection device 110a reads the ID of the message received from bus 130.

In Step S212, anomaly detection device 110a determines whether the read ID is included in the transmitted ID list.

In the case where the read ID is included in the transmitted ID list (Step S212: YES), anomaly detection device 110a detects the message received from bus 130 as an anomalous message, and performs processes in Steps S213, S214, and S215. In the case where the read ID is not included in the transmitted ID list (Step S212: NO), anomaly detection device 110a detects the message received from bus 130 as a normal message, and performs a process in Step S216.

In Step S213, anomaly detection device 110a discards the received message. That is, anomaly detection device 110a does not transmit the message received from bus 130, to ECU 101a. By not transmitting the message from an ECU connected to bus 130 to ECU 101a, the anomalous message can be kept from being transmitted to ECU 101a.

In Step S214, anomaly detection device 110a notifies bus 130 that an anomalous ECU is connected to bus 130.

In Step S215, anomaly detection device 110a notifies ECU 101a that an anomalous ECU is connected to bus 130.

In Step S216, as the message received from bus 130 is normal, anomaly detection device 110a transfers the message to ECU 101a.

Thus, an anomaly in in-vehicle network 100 can be easily detected, without adding an IDS ECU in in-vehicle network 100 (i.e. without increasing the network traffic and cost) or prestoring an ID of a message transmitted from each ECU.

[1-22. Process Flow in the Case where Anomaly Detection Device Receives Anomaly Notification from IDS ECU]

Figure 22:
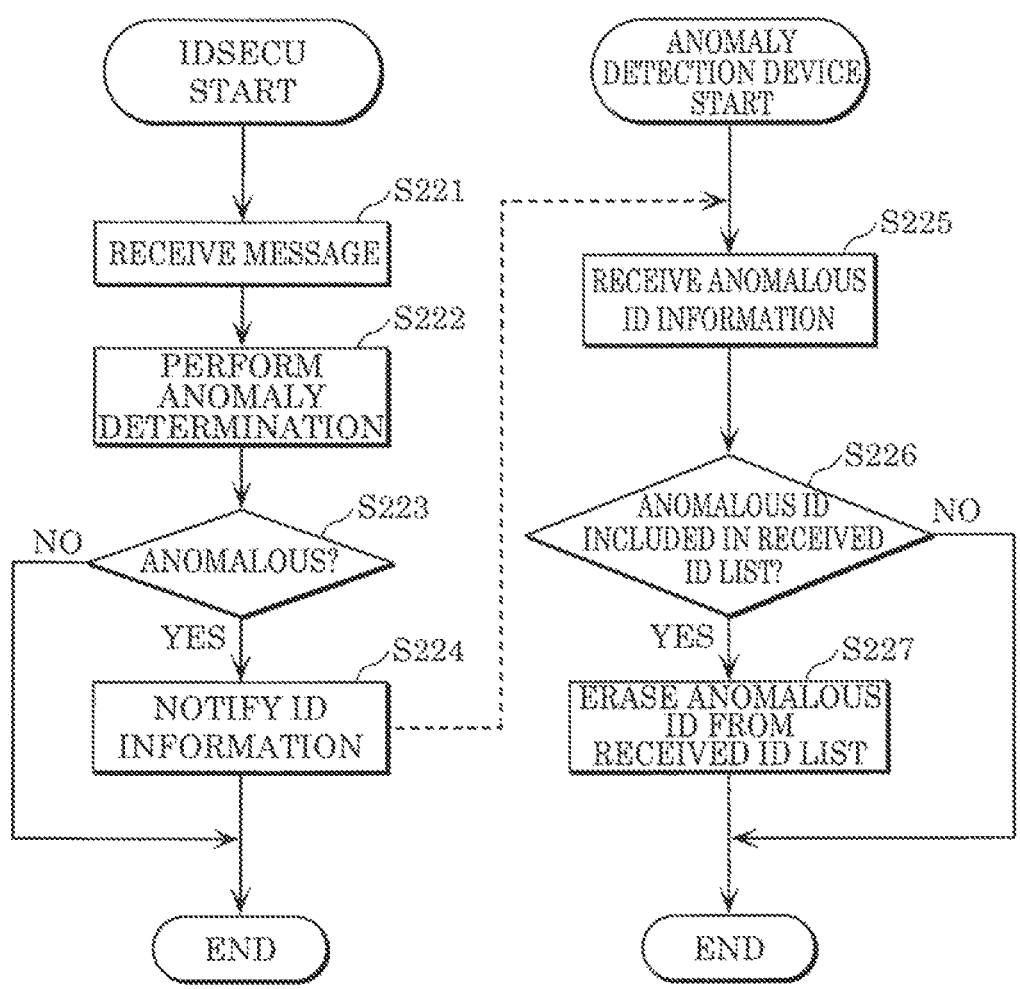
FIG. 22 is a flowchart of a process in the case where the anomaly detection device receives an anomaly notification from the IDS ECU in Embodiment 1.

FIG. 22 is a flowchart of a process in the case where the anomaly detection device receives an anomaly notification from IDS ECU 120. FIG. 22 also illustrates a process (Steps S221 to S224) in IDS ECU 120 before the anomaly detection device receives an anomaly notification from IDS ECU 120.

In Step S221, IDS ECU 120 receives a message from bus 130.

In Step S222, IDS ECU 120 performs anomaly determination on the received message.

In Step S223, IDS ECU 120 determines whether the result of anomaly determination in Step S222 is that the message is anomalous. In the case where the result of anomaly determination is that the message is anomalous (Step S223: YES), IDS ECU 120 performs a process in Step S224. In the case where the result of anomaly determination is that the message is not anomalous (Step S223: NO), IDS ECU 120 ends the process.

In Step S224, IDS ECU 120 transmits anomalous ID information indicating the anomalous ID included in the message determined as anomalous, to anomaly detection devices 110a, 110b, 110d, and 110f connected to bus 130. Anomaly detection device 110a will be described as an example below.

In Step S225, anomaly detection device 110a receives, from bus 130, the anomalous ID information transmitted from IDS ECU 120 and indicating the anomalous ID. Having received, from bus 130, the anomalous ID information transmitted from IDS ECU 120 and indicating the anomalous ID, anomaly detection device 110a erases the ID indicated by the anomalous ID information from the received ID list. Specifically, anomaly detection device 110a performs the following process.

In Step S226, anomaly detection device 110a determines whether the anomalous ID indicated by the received anomalous ID information is included in the received ID list. In the case where the anomalous ID is included in the received ID list (Step S226: YES), anomaly detection device 110a performs a process in Step S227. In the case where the anomalous ID is not included in the received ID list (Step S226: NO), anomaly detection device 110a ends the process.

In Step S227, anomaly detection device 110a erases the anomalous ID from the received ID list.

There is a possibility that an attacker transmits an unauthorized message to bus 130 before an authorized message flows in bus 130. In this case, the ID included in the unauthorized message is added to the received ID list. For example, in the case where the ID included in the message transmitted by authorized ECU 101a is included in the unauthorized message, the authorized message transmitted from authorized ECU 101a will end up being determined as an unauthorized message. Subsequently, the attacker impersonates ECU 101a and transmits an unauthorized message to bus 130, while an authorized message is not transmitted to bus 130. For example by providing IDS ECU 120 in in-vehicle network 100 as described above, such an unauthorized message transmitted by the attacker can be detected. Thus, even in the case where an attacker transmits an unauthorized message to bus 130 before an authorized message flows in bus 130 (i.e. in the case where the received ID list is contaminated), by erasing the ID included in the unauthorized message (e.g. the ID included in the message transmitted by ECU 101a) added to the received ID list from the received ID list to correct the received ID list, anomaly detection device 110a can be prevented from erroneously detecting an authorized message as an unauthorized message.

[1-23. Overall Process Flow of Anomaly Detection Device (Variation)]

Figure 23:
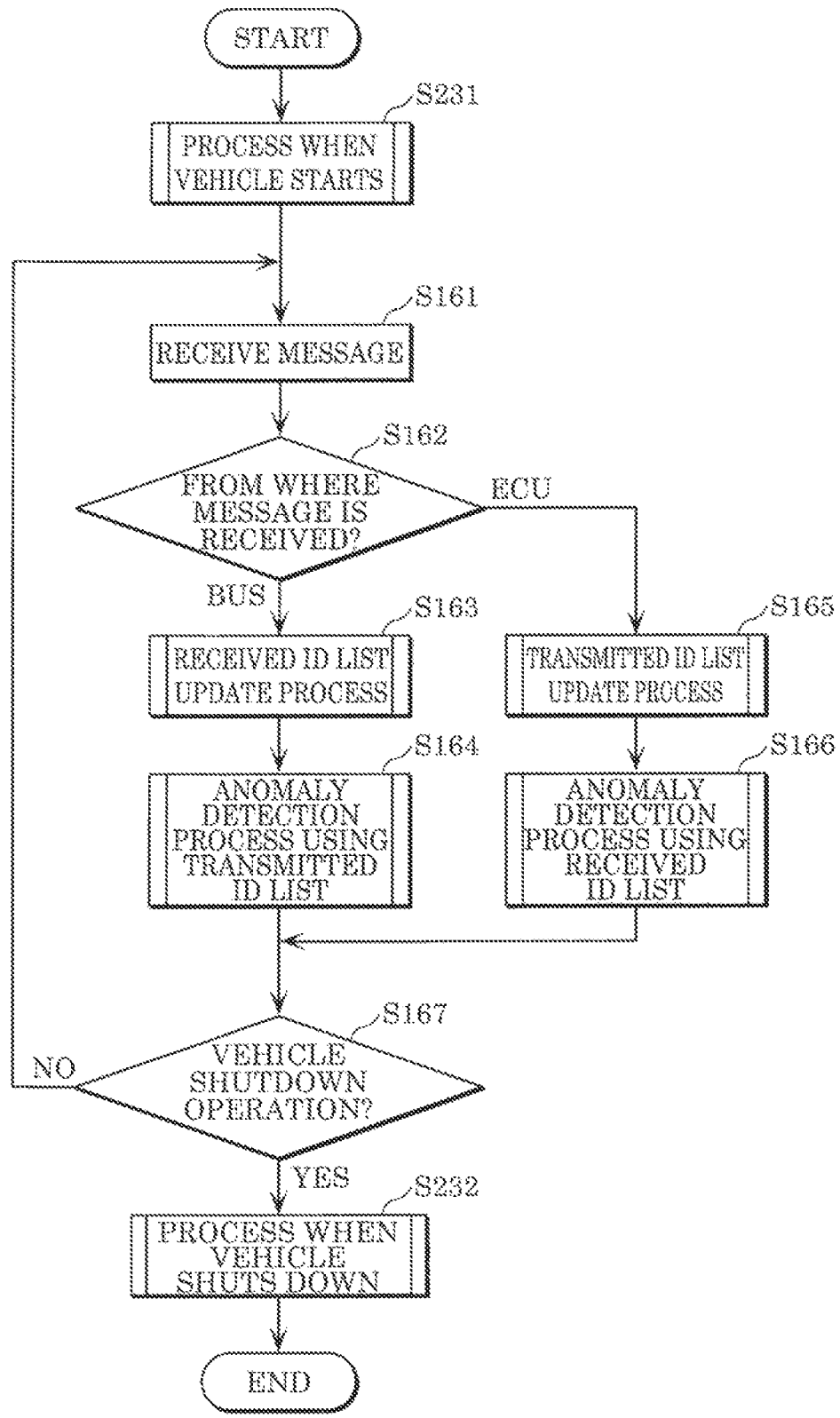
FIG. 23 is a flowchart of a variation of the overall process of the anomaly detection device in Embodiment 1.

FIG. 23 is a flowchart of a variation of the overall process of anomaly detection device 110a. FIG. 23 illustrates the variation of the overall process of anomaly detection device 110a in the flowchart in FIG. 16. Specifically, in FIG. 23, a process of determining whether there is a shutdown operation on vehicle 10 in Step S167, a process when vehicle 10 starts in Step S231, and a process when vehicle 10 shuts down in Step S232 are added to the overall process in FIG. 16.

Step S231 will be described in detail later, with reference to FIG. 27.

When there is a shutdown operation on vehicle 10 in Step S167 (Step S167: YES), anomaly detection device 110a performs Step S232. When there is not a shutdown operation on vehicle 10 in Step S167 (Step S167: NO), anomaly detection device 110a returns to Step S161. Step S232 will be described in detail below, with reference to FIGS. 24 to 26.

[1-24. Process Flow when Vehicle Shuts Down]

FIG. 24 is a flowchart of a process of anomaly detection device 110a when vehicle shuts down. FIG. 24 is a detailed flowchart of the process of anomaly detection device 110a when vehicle shuts down in Step S232 in FIG. 23.

In Step S241, anomaly detection device 110a performs a low-frequency received ID save process. The process in Step S241 will be described in detail below, with reference to FIG. 25.

In Step S242, anomaly detection device 110a performs a low-frequency transmitted ID save process. The process in Step S242 will be described in detail below, with reference to FIG. 26.

[1-25. Low-Frequency Received ID Save Process Flow]

FIG. 25 is a flowchart of a low-frequency received ID save process. FIG. 25 is a detailed flowchart of the low-frequency received ID save process in Step S241 in FIG. 24.

In Step S251, anomaly detection device 110a selects an ID not yet selected in the low-frequency received ID save process, from the received ID list.

In Step S252, anomaly detection device 110a calculates, for the selected ID, the frequency of received messages based on the number of received messages recorded in received ID list holder 114. For example, anomaly detection device 110a calculates the frequency of received messages by dividing the number of received messages by the time until vehicle 10 shuts down after vehicle 10 starts. Anomaly detection device 110a may obtain the number of received messages recorded in received ID list holder 114, for the selected ID. The number of received messages may be, for example, the number of times ECU 101a has received the message from bus 130 for a predetermined time such as the last 1 minute, the last 30 minutes, or the last 1 hour before vehicle 10 shuts down.

In Step S253, anomaly detection device 110a determines whether the frequency of received messages calculated in Step S252 is less than or equal to a predetermined value set beforehand. In the case where the frequency of received messages is less than or equal to the predetermined value (Step S253: YES), anomaly detection device 110a determines the ID for which the frequency of received messages is less than or equal to the predetermined value as a low-frequency received ID, and performs a process in Step S254. In the case where the frequency of received messages is greater than the predetermined value (Step S253: NO), anomaly detection device 110a performs a process in Step S255. In the case where anomaly detection device 110a obtains the number of received messages recorded in received ID list holder 114 for the selected ID in Step S252, anomaly detection device 110a may determine whether the number of received messages obtained in Step S252 is less than or equal to a predetermined value set beforehand. In the case where the number of received messages is less than or equal to the predetermined value, anomaly detection device 110a determines the ID for which the number of received messages is less than or equal to the predetermined value as a low-frequency received ID, and performs the process in Step S254. In the case where the number of received messages is greater than the predetermined value, anomaly detection device 110a performs the process in Step S255. Thus, based on the assumption that the frequency of received messages is low if the number of received messages is low, anomaly detection device 110a may simply obtain the number of received messages in Step S252 without calculating the frequency of received messages from the number of received messages.

In Step S254, anomaly detection device 110a saves the selected ID to nonvolatile memory.

In Step S255, anomaly detection device 110a determines whether there is any unselected ID in the received ID list. In the case where there is an unselected ID (Step S255: YES), anomaly detection device 110a returns to Step S251. In the case where there is no unselected ID (Step S255: NO), anomaly detection device 110a ends the process. Thus, a plurality of low-frequency received IDs can be saved to the nonvolatile memory.

[1-26. Low-Frequency Transmitted ID Save Process Flow]

Figure 26:
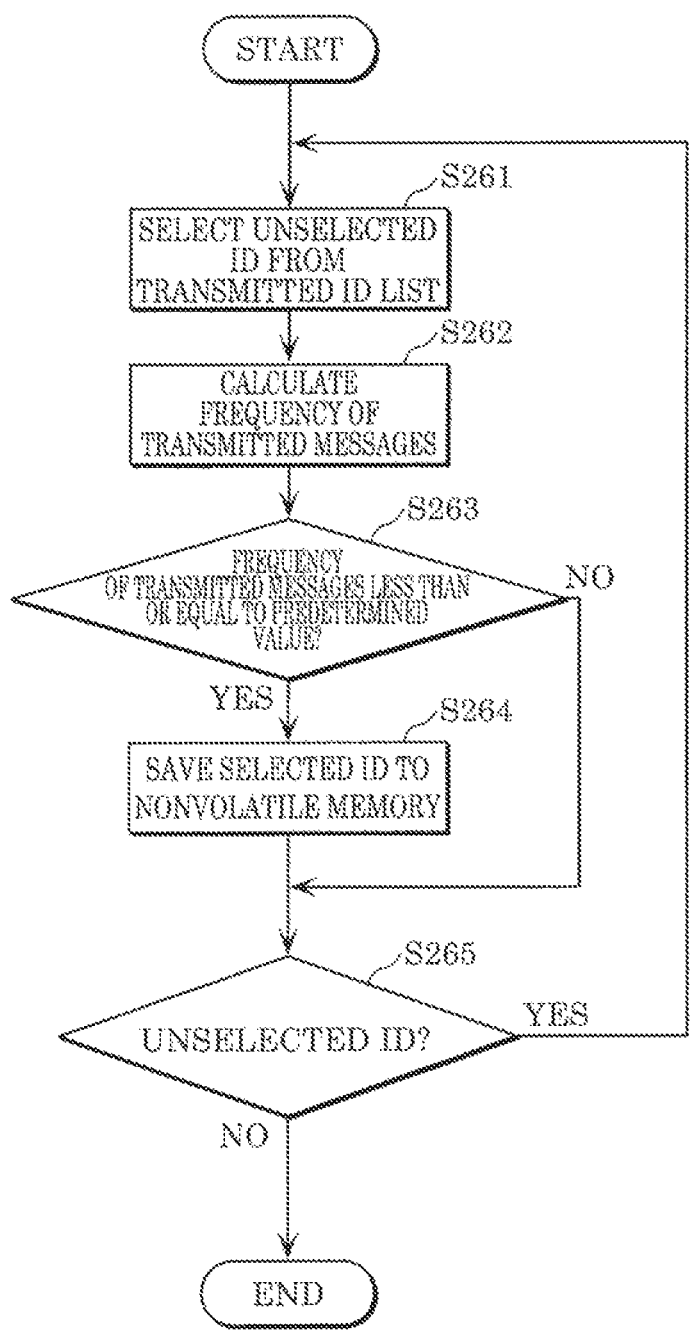
FIG. 26 is a flowchart of a low-frequency transmitted ID save process in Embodiment 1.

FIG. 26 is a flowchart of a low-frequency transmitted ID save process. FIG. 26 is a detailed flowchart of the low-frequency transmitted ID save process in Step S242 in FIG. 24.

In Step S261, anomaly detection device 110a selects an ID not yet selected in the low-frequency transmitted ID save process, from the transmitted ID list.

In Step S262, anomaly detection device 110a calculates, for the selected ID, the frequency of transmitted messages based on the number of transmitted messages recorded in transmitted ID list holder 113. For example, anomaly detection device 110a calculates the frequency of transmitted messages by dividing the number of transmitted messages by the time until vehicle 10 shuts down after vehicle 10 starts. Anomaly detection device 110a may obtain the number of transmitted messages recorded in transmitted ID list holder 113, for the selected ID. The number of transmitted messages may be, for example, the number of times ECU 101a has transmitted the message to bus 130 for a predetermined time such as the last 1 minute, the last 30 minutes, or the last 1 hour before vehicle 10 shuts down.

In Step S263, anomaly detection device 110a determines whether the frequency of transmitted messages calculated in Step S262 is less than or equal to a predetermined value set beforehand. In the case where the frequency of transmitted messages is less than or equal to the predetermined value (Step S263: YES), anomaly detection device 110a determines the ID for which the frequency of transmitted messages is less than or equal to the predetermined value as a low-frequency transmitted ID, and performs a process in Step S264. In the case where the frequency of transmitted messages is greater than the predetermined value (Step S263: NO), anomaly detection device 110a performs a process in Step S265. In the case where anomaly detection device 110a obtains the number of transmitted messages recorded in transmitted ID list holder 113 for the selected ID in Step S262, anomaly detection device 110a may determine whether the number of transmitted messages obtained in Step S262 is less than or equal to a predetermined value set beforehand. In the case where the number of transmitted messages is less than or equal to the predetermined value, anomaly detection device 110a determines the ID for which the number of transmitted messages is less than or equal to the predetermined value as a low-frequency transmitted ID, and performs the process in Step S264. In the case where the number of transmitted messages is greater than the predetermined value, anomaly detection device 110a performs the process in Step S265. Thus, based on the assumption that the frequency of transmitted messages is low if the number of transmitted messages is low, anomaly detection device 110a may simply obtain the number of transmitted messages in Step S262 without calculating the frequency of transmitted messages from the number of transmitted messages.

In Step S264, anomaly detection device 110a saves the selected ID to nonvolatile memory.

In Step S265, anomaly detection device 110a determines whether there is any unselected ID in the transmitted ID list. In the case where there is an unselected ID (Step S265: YES), anomaly detection device 110a returns to Step S261. In the case where there is no unselected ID (Step S265: NO), anomaly detection device 110a ends the process. Thus, a plurality of low-frequency transmitted IDs can be saved to the nonvolatile memory.

[1-27. Process Flow when Vehicle Starts]

Figure 27:
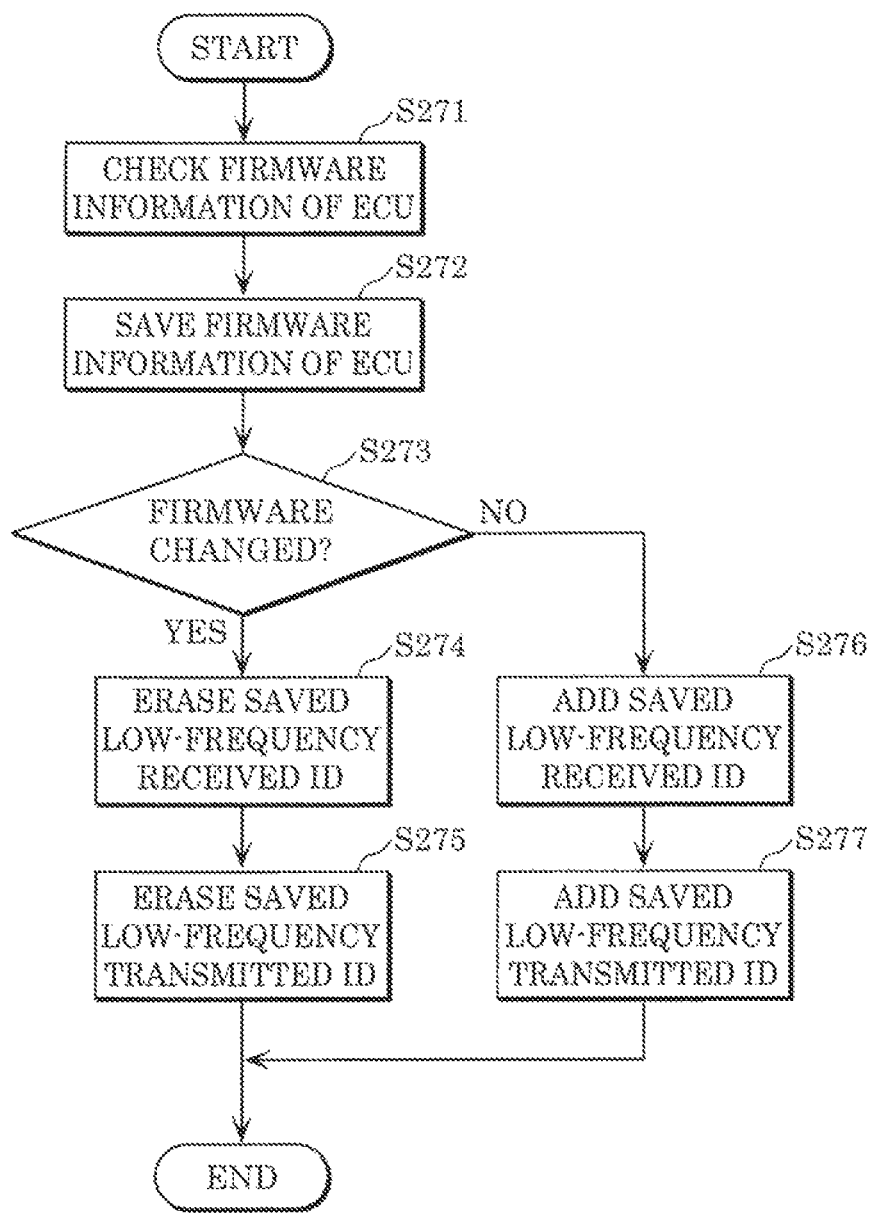
FIG. 27 is a flowchart of a process of the anomaly detection device when the vehicle starts in Embodiment 1.

FIG. 27 is a flowchart of a process of anomaly detection device 110a when vehicle starts. FIG. 27 is a detailed flowchart of the process of anomaly detection device 110a when vehicle starts in Step S231 in FIG. 23.

In Step S271, when vehicle 10 starts, anomaly detection device 110a checks firmware information of ECU 101a connected to anomaly detection device 110a.

In Step S272, anomaly detection device 110a saves the current firmware information in order to use it in the process in Step S271 performed when vehicle 10 starts next time.

In Step S273, anomaly detection device 110a determines whether the firmware information of ECU 101a has been changed (updated) since vehicle 10 last started. In the case where the firmware information has been changed (Step S273: YES), anomaly detection device 110a performs a process in Step S274. In the case where the firmware information has not been changed (Step S273: NO), anomaly detection device 110a performs a process in Step S276.

When vehicle 10 starts for the first time, there is no previous firmware information, and accordingly the firmware information is regarded as unchanged. The firmware information of ECU 101a, when vehicle 10 started last time, is saved in the process in Step S272 performed when vehicle 10 started last time. That is, the process illustrated in FIG. 27 is performed each time vehicle 10 starts.

In Step S274, anomaly detection device 110a resets each low-frequency received ID saved to the nonvolatile memory in Step S254 in FIG. 25.

In Step S275, anomaly detection device 110a resets each low-frequency transmitted ID saved to the nonvolatile memory in Step S264 in FIG. 26.

In the case where the firmware information of the ECU is changed as a result of a firmware update of the ECU, there is a possibility that the specifications of an ID included in a message transmitted from the ECU are changed. In such a case, by erasing the ID saved to the nonvolatile memory without adding the ID to the received ID list or the transmitted ID list, erroneous blocking of a normal message due to the ID whose specifications have been changed can be prevented.

In Step S276, anomaly detection device 110a reads each low-frequency received ID saved to the nonvolatile memory in Step S254 in FIG. 25, into the received ID list in anomaly detection device 110a.

For an ID for which the number of received messages or the frequency of received messages is less than or equal to a predetermined value (i.e. an ID included in a message received at low frequency), it may take time until a message including the ID flows in bus 130 after vehicle 10 starts. In detail, there is a possibility that, before an authorized message including the ID flows in bus 130, an attacker transmits an unauthorized message including the ID to bus 130 and as a result the ID included in the unauthorized message is added to the received ID list (i.e. the received ID list is contaminated with the unauthorized ID). However, by adding an ID included in a message received at low frequency, which has been saved to the nonvolatile memory, to the received ID list when vehicle 10 starts, contamination of the received ID list caused by an attacker transmitting an unauthorized message before a message received at low frequency first flows in the network bus can be prevented. In addition, by not saving an ID included in a message received at high frequency to the nonvolatile memory, the memory capacity can be saved.

In Step S277, anomaly detection device 110a reads each low-frequency transmitted ID saved to the nonvolatile memory in Step S264 in FIG. 26, into the transmitted ID list in anomaly detection device 110a.

For an ID for which the number of transmitted messages or the frequency of transmitted messages is less than or equal to a predetermined value (i.e. an ID included in a message transmitted from ECU 101a at low frequency), it may take time until anomaly detection device 110a receives a message including the ID from ECU 101a after vehicle 10 starts. In detail, there is a possibility that, before anomaly detection device 110a receives an authorized message including the ID, an attacker attacks ECU 101a and transmits an unauthorized message to anomaly detection device 110a from unauthorized ECU 101a and as a result the ID included in the unauthorized message is added to the transmitted ID list (i.e. the transmitted ID list is contaminated with the unauthorized ID). However, by adding an ID included in a message transmitted at low frequency, which has been saved to the nonvolatile memory, to the transmitted ID list when vehicle 10 starts, contamination of the transmitted ID list caused by an attacker transmitting an unauthorized message before anomaly detection device 110a receives a message transmitted at low frequency can be prevented. In addition, by not saving an ID included in a message transmitted at high frequency to the nonvolatile memory, the memory capacity can be saved.

Anomaly detection device 110a may, when vehicle 10 starts, add each ID saved to the nonvolatile memory to the received ID list or the transmitted ID list, without checking the firmware information. That is, when vehicle 10 starts, the processes in Steps S276 and S277 may be performed without the processes in Steps S271 to S275.

Other Embodiments

For example, although the anomaly detection device includes transmitted ID list holder 113 in the foregoing embodiment, the anomaly detection device may not include transmitted ID list holder 113. In this case, controller 112 need not perform control relating to transmitted ID list holder 113.

For example, although the anomaly detection device includes received ID list holder 114 in the foregoing embodiment, the anomaly detection device may not include received ID list holder 114. In this case, controller 112 need not perform control relating to received ID list holder 114.

For example, although controller 112, in the case where the ID of the message received by communication section 111 from the ECU is included in the received ID list, isolates the ECU from bus 130 in the foregoing embodiment, controller 112 may only cause the message not to be transmitted to bus 130, without isolating the ECU.

For example, although received ID list holder 114 has a region for recording the number of received messages for each ID included in the received ID list in the foregoing embodiment, received ID list holder 114 may not have such a region. In this case, controller 112 need not perform control relating to the number of received messages.

For example, although transmitted ID list holder 113 has a region for recording the number of transmitted messages for each ID included in the transmitted ID list in the foregoing embodiment, transmitted ID list holder 113 may not have such a region. In this case, controller 112 need not perform control relating to the number of transmitted messages.

In-vehicle network 100 according to the present disclosure is typically an in-vehicle CAN network as described above, but is not limited to such. For example, in-vehicle network 100 may be a network such as CAN-FD (CAN with Flexible Data rate), FlexRay®, Ethernet®, LIN (Local Interconnect Network), or MOST (Media Oriented Systems Transport). An in-vehicle network in which a CAN network is combined with any of these networks as a sub-network is also applicable.

Although the foregoing embodiment describes security measures in in-vehicle network 100 included in an automobile, the range of application of the present disclosure is not limited to such. The presently disclosed technique is usable not only in automobiles but also in mobile objects such as construction machines, farm machines, ships, railways, and planes. Thus, the presently disclosed technique is usable as Cybersecurity measures in mobility networks and mobility network systems.

Each device in the foregoing embodiment is specifically a computer system including a microprocessor, ROM, RAM, and a hard disk unit. A computer program is recorded in the RAM or hard disk unit. The device achieves its functions by the microprocessor operating according to the computer program. The computer program is configured by combining multiple command codes indicating instructions to the computer, to achieve predetermined functions.

Part or all of the structural elements constituting each device in the foregoing embodiment may be configured as a single system large scale integration (LSI). A system LSI is a super-multifunctional LSI manufactured by integrating multiple components on a single chip, and specifically is a computer system including a microprocessor, ROM, RAM, and so forth. A computer program is recorded in the RAM. The system LSI achieves its functions by the microprocessor operating according to the computer program.

The parts of the structural elements constituting each device may be individually formed into one chip, or part or all thereof may be included in one chip.

While description has been made regarding a system LSI, there are different names such as IC, LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI or a reconfigurable processor where circuit cell connections and settings within the LSI can be reconfigured may be used.

Further, in the event of the advent of an integrated circuit technology which would replace LSIs by advance of semiconductor technology or a separate technology derived therefrom, such a technology may be used for integration of the functional blocks. Application of biotechnology is a possibility.

Part or all of the structural elements constituting each device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

The present disclosure can be implemented not only as an anomaly detection device but also as an anomaly detection method including steps (processes) performed by the structural elements constituting the anomaly detection device.

The anomaly detection method is an anomaly detection method for use in an anomaly detection device in in-vehicle network 100 that includes a plurality of ECUs, bus 130, and the anomaly detection device, the anomaly detection device being located between bus 130 and a first ECU included in the plurality of ECUs, and including: communication section 111 that receives a message from the first ECU and transmits the message to bus 130, and receives a message from bus 130 and transmits the message to the first ECU; and received ID list holder 114 that holds a received ID list which is a list of IDs of messages that communication section 111 has received from bus 130 and transmitted to the first ECU, the anomaly detection method including: in the case where an ID of the message received by communication section 111 from bus 130 is not included in the received ID list (Step S172 in FIG. 17: NO), adding the ID to the received ID list (Step S173 in FIG. 17); and in the case where an ID of the message received by communication section 111 from the first ECU is included in the received ID list (Step S192 in FIG. 19: YES), causing communication section 111 not to transmit the message to bus 130 (Step S193 in FIG. 19).

The present disclosure may be a computer program which realizes these methods by a computer, or may be digital signals made up of the computer program.

The present disclosure may be the computer program or the digital signals recorded in a computer-readable recording medium, such as flexible disk, hard disk, CD-ROM, MO, DVD, DVD-ROM, DVD-RAM, Blu-ray® disc (BD), or semiconductor memory. The present disclosure may also be the digital signals recorded in these recording media.

The present disclosure may be an arrangement where the computer program or the digital signals are transmitted over an electric communication line, a wireless or wired communication line, a network such as the Internet, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

While an anomaly detection device, etc. according to one or more aspects have been described above by way of embodiments, the present disclosure is not limited to the foregoing embodiments. Other modifications obtained by applying various changes conceivable by a person skilled in the art to the embodiments and any combinations of the structural elements in different embodiments without departing from the scope of the present disclosure are also included in the scope of one or more aspects.

For example, in each of the foregoing embodiments, processes performed by specific structural elements may be performed by other structural elements instead of the specific structural elements. Moreover, a plurality of processes may be changed in order, and a plurality of processes may be performed in parallel.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The presently disclosed technique is usable, for example, in vehicles including in-vehicle networks.

What is claimed is:

1. An electronic control unit in an in-vehicle network included in a vehicle, the in-vehicle network including the electronic control unit, a plurality of other electronic control units (ECUs) and a network, the electronic control unit comprising:
   a vehicle control processor that performs processes relating to vehicle control;
   a communication circuit;
   a processor; and
   at least one memory including at least one set of instructions that, when executed by the processor, causes the processor to perform operations including:
   obtaining a message from the vehicle control processor and transmitting the message to the network using the communication circuit, and receiving a message from the network using the communication circuit and notifying the message to the vehicle control processor;
   holding, in the at least one memory, a received ID list which is a list of IDs of messages from the plurality of other ECUs received from the network by the communication circuit and notified to the vehicle control processor;
   in the case where an ID of the message from one of the plurality of other ECUs that is received by the communication circuit from the network is not included in the received ID list, adding the ID to the received ID list; and
   in the case where an ID of the message obtained from the vehicle control processor is included in the received ID list, causing the communication circuit not to transmit the message to the network.

2. The electronic control unit according to claim 1, wherein, the operations further include, in the case where the ID of the message received from the vehicle control processor is included in the received ID list, isolating the vehicle control processor from the network.

3. The electronic control unit according to claim 1, wherein, the operations further include, in the case where the communication circuit receives, from the network, anomalous ID information transmitted from one ECU included in the plurality of other ECUs, erasing the ID indicated by the anomalous ID information from the received ID list, the anomalous ID information indicating an ID that is anomalous.

4. The electronic control unit according to claim 1, wherein the at least one memory has a region for recording the number of received messages for each of the IDs included in the received ID list, and
the operations further include:
when the communication circuit receives the message from the network, updating the number of received messages for the ID of the message;
when the vehicle shuts down, saving an ID among the IDs included in the received ID list to nonvolatile memory, the ID being an ID for which the number of received messages recorded in the at least one memory or the frequency of received messages based on the number of received messages is less than or equal to a predetermined value; and
when the vehicle starts, adding the ID saved to the nonvolatile memory, to the received ID list.

5. The electronic control unit according to claim 4, wherein, the operations further include, when the vehicle starts, in the case where firmware information of the vehicle control processor has been changed since the vehicle last started, erasing the ID saved to the nonvolatile memory, without adding the ID to the received ID list.

6. The electronic control unit according to claim 1, wherein the at least one memory further holds a transmitted ID list which is a list of IDs of messages that have been obtained from the vehicle control processor and have been transmitted to the network by the communication circuit, and
the operations further include:
in the case where the ID of the message obtained from the vehicle control processor is not included in the transmitted ID list, adding the ID to the transmitted ID list; and
in the case where the ID of the message obtained from the network is included in the transmitted ID list, causing the communication circuit not to notify the message to the vehicle control processor.

7. The electronic control unit according to claim 6, wherein the at least one memory has a region for recording the number of transmitted messages for each of the IDs included in the transmitted ID list, and
the operations further include:
when the message is received from the vehicle control processor, updating the number of transmitted messages for the ID of the message;
when the vehicle shuts down, saving an ID among the IDs included in the received ID list to nonvolatile memory, the ID being an ID for which the number of transmitted messages recorded in the at least one memory or the frequency of transmitted messages based on the number of transmitted messages is less than or equal to a predetermined value; and
when the vehicle starts, adding the ID saved to the nonvolatile memory, to the transmitted ID list.

8. The electronic control unit according to claim 7, wherein, the operations further include, when the vehicle starts, in the case where firmware information of the vehicle control processor has been changed since the vehicle last started, erasing the ID saved to the nonvolatile memory, without adding the ID to the transmitted ID list.

9. A method for use in an electronic control unit in an in-vehicle network included in a vehicle, the in-vehicle network including the electronic control unit, a plurality of other electronic control units (ECUs), and a network, the electronic control unit including a vehicle control processor that performs processes relating to vehicle control, the method comprising:
in the case where an ID of a message from the plurality of other ECUs that is received by a communication circuit from the network is not included in a received ID list, adding the ID to the received ID list, the received ID list being a list of IDs of messages from the plurality of other ECUs that has been received from the network by the communication circuit and has been notified to the vehicle control processor; and
in the case where an ID of a message obtained from the vehicle control processor is included in the received ID list, causing the communication circuit not to transmit the message to the network.

10. A non-transitory computer-readable recording medium that stores a program for causing a computer to execute the method according to claim 9.

* * * * *